United States Patent
Fujinaga

(10) Patent No.: US 9,262,111 B2
(45) Date of Patent: Feb. 16, 2016

(54) PRINT CONTROL APPARATUS, PRINT CONTROL METHOD, AND NON-TRANSITORY COMPUTER READABLE RECORDING MEDIUM

(71) Applicant: CANON KABUSHIKI KAISHA, Tokyo (JP)

(72) Inventor: Seiya Fujinaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/553,710

(22) Filed: Nov. 25, 2014

(65) Prior Publication Data

US 2015/0153985 A1 Jun. 4, 2015

(30) Foreign Application Priority Data

Nov. 29, 2013 (JP) .................................. 2013-248456

(51) Int. Cl.
*G06F 15/00* (2006.01)
*G06F 3/12* (2006.01)
*G06K 15/02* (2006.01)

(52) U.S. Cl.
CPC ............ *G06F 3/1263* (2013.01); *G06F 3/1203* (2013.01); *G06F 3/124* (2013.01); *G06K 15/022* (2013.01)

(58) Field of Classification Search
CPC ...................................................... G06F 3/1263
USPC ............................................................ 358/1.15
See application file for complete search history.

(56) References Cited

U.S. PATENT DOCUMENTS

| 2008/0192281 A1* | 8/2008 | Hagiwara | G03G 15/5012 358/1.15 |
| 2011/0211211 A1* | 9/2011 | Nakamura | 358/1.12 |

FOREIGN PATENT DOCUMENTS

JP 2011201059 A 10/2011

* cited by examiner

*Primary Examiner* — Saeid Ebrahimi Dehkordy
(74) *Attorney, Agent, or Firm* — Canon U.S.A., Inc., IP Division

(57) ABSTRACT

A print control apparatus that discharges a print product produced by a print unit by using any of a plurality of discharge methods includes a first specifying unit that specifies a priority of an input print job and a second specifying unit that specifies a discharge method set for the input print job. The print control apparatus further includes a determination unit that determines an order of printing of the input print job in queued print jobs in accordance with a specifying result of the first specifying unit and a discharge method specified by the second specifying unit, and a print control unit configured to cause the print unit to execute printing based on the input print job on a continuous sheet in accordance with the order of printing of the print job determined by the determination unit.

19 Claims, 26 Drawing Sheets

FIG. 16A

| JOB ID | STATE | PRIORITY | SHEET DISCHARGE METHOD |
|---|---|---|---|
| 000001 | PRINTED | NORMAL | CUT |
| 000002 | BEING PRINTED | NORMAL | CUT |
| 000003 | WAITING TO PRINT | NORMAL | CUT |
| 000004 | WAITING TO PRINT | NORMAL | CUT |
| 000005 | WAITING TO PRINT | HIGH | CUT |
| 000006 | WAITING TO PRINT | NORMAL | CUT |
| 000007 | WAITING TO PRINT | HIGH | ROLL |
| 000008 | WAITING TO PRINT | NORMAL | ROLL |
| 000009 | WAITING TO PRINT | NORMAL | ROLL |
| 000010 | WAITING TO PRINT | NORMAL | ROLL |
| 000011 | WAITING TO PRINT | NORMAL | CUT |
| 000012 | WAITING TO PRINT | NORMAL | CUT |
| 000013 | WAITING TO PRINT | NORMAL | CUT |
| 000014 | WAITING TO PRINT | HIGH | CUT |

FIG. 16B

| JOB ID | STATE | PRIORITY | SHEET DISCHARGE METHOD |
|---|---|---|---|
| 000001 | PRINTED | NORMAL | CUT |
| 000002 | BEING PRINTED | NORMAL | CUT |
| 000005 | WAITING TO PRINT | HIGH | CUT |
| 000003 | WAITING TO PRINT | NORMAL | CUT |
| 000004 | WAITING TO PRINT | NORMAL | CUT |
| 000006 | WAITING TO PRINT | NORMAL | CUT |
| 000008 | WAITING TO PRINT | NORMAL | ROLL |
| 000009 | WAITING TO PRINT | NORMAL | ROLL |
| 000010 | WAITING TO PRINT | NORMAL | ROLL |
| 000007 | WAITING TO PRINT | HIGH | ROLL |
| 000014 | WAITING TO PRINT | NORMAL | CUT |
| 000011 | WAITING TO PRINT | NORMAL | CUT |
| 000012 | WAITING TO PRINT | NORMAL | CUT |
| 000013 | WAITING TO PRINT | HIGH | CUT |

FIG. 17A

| JOB ID | STATE | PRIORITY | SHEET DISCHARGE METHOD |
|--------|-------|----------|------------------------|
| 000001 | PRINTED | NORMAL | CUT |
| 000002 | BEING PRINTED | NORMAL | CUT |
| 000003 | WAITING TO PRINT | NORMAL | ROLL |
| 000004 | WAITING TO PRINT | NORMAL | ROLL |
| 000005 | WAITING TO PRINT | HIGH | ROLL |
| 000006 | WAITING TO PRINT | NORMAL | ROLL |
| 000007 | WAITING TO PRINT | HIGH | ROLL |
| 000008 | WAITING TO PRINT | NORMAL | ROLL |
| 000009 | WAITING TO PRINT | NORMAL | ROLL |
| 000010 | WAITING TO PRINT | NORMAL | ROLL |
| 000011 | WAITING TO PRINT | NORMAL | CUT |
| 000012 | WAITING TO PRINT | NORMAL | CUT |
| 000013 | WAITING TO PRINT | NORMAL | CUT |
| 000014 | WAITING TO PRINT | NORMAL | CUT |

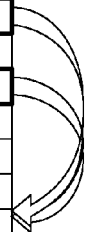

FIG. 17B

| JOB ID | STATE | PRIORITY | SHEET DISCHARGE METHOD |
|--------|-------|----------|------------------------|
| 000001 | PRINTED | NORMAL | CUT |
| 000002 | BEING PRINTED | NORMAL | CUT |
| 000003 | WAITING TO PRINT | NORMAL | ROLL |
| 000004 | WAITING TO PRINT | NORMAL | ROLL |
| 000006 | WAITING TO PRINT | NORMAL | ROLL |
| 000008 | WAITING TO PRINT | NORMAL | ROLL |
| 000009 | WAITING TO PRINT | NORMAL | ROLL |
| 000010 | WAITING TO PRINT | NORMAL | ROLL |
| 000005 | WAITING TO PRINT | HIGH | ROLL |
| 000007 | WAITING TO PRINT | HIGH | ROLL |
| 000011 | WAITING TO PRINT | NORMAL | CUT |
| 000012 | WAITING TO PRINT | NORMAL | CUT |
| 000013 | WAITING TO PRINT | NORMAL | CUT |
| 000014 | WAITING TO PRINT | NORMAL | CUT |

FIG. 18C

| JOB ID | STATE | PRIORITY | SHEET DISCHARGE METHOD | ROLL SHEET TO BE USED |
|---|---|---|---|---|
| 000001 | PRINTED | NORMAL | CUT | ROLL SHEET A |
| 000002 | BEING PRINTED | NORMAL | CUT | ROLL SHEET A |
| 000003 | WAITING TO PRINT | NORMAL | ROLL | ROLL SHEET A |
| 000004 | WAITING TO PRINT | NORMAL | ROLL | ROLL SHEET A |
| 000006 | WAITING TO PRINT | NORMAL | ROLL | ROLL SHEET A |
| 000008 | WAITING TO PRINT | NORMAL | ROLL | ROLL SHEET A |
| 000005 | WAITING TO PRINT | HIGH | ROLL | ROLL SHEET A |
| 000007 | WAITING TO PRINT | HIGH | ROLL | ROLL SHEET A |
| 000009 | WAITING TO PRINT | NORMAL | ROLL | ROLL SHEET B |
| 000010 | WAITING TO PRINT | NORMAL | ROLL | ROLL SHEET B |
| 000011 | WAITING TO PRINT | NORMAL | CUT | ROLL SHEET B |
| 000012 | WAITING TO PRINT | NORMAL | CUT | ROLL SHEET B |
| 000013 | WAITING TO PRINT | NORMAL | CUT | ROLL SHEET B |
| 000014 | WAITING TO PRINT | NORMAL | CUT | ROLL SHEET B |

FIG. 20A

| JOB ID | STATE | PRIORITY | SHEET DISCHARGE METHOD | ROLL SHEET TO BE USED |
|---|---|---|---|---|
| 000001 | PRINTED | NORMAL | CUT | ROLL SHEET A |
| 000002 | BEING PRINTED | NORMAL | CUT | ROLL SHEET A |
| 000003 | WAITING TO PRINT | NORMAL | ROLL | ROLL SHEET A |
| 000004 | WAITING TO PRINT | NORMAL | ROLL | ROLL SHEET A |
| 000005 | WAITING TO PRINT | NORMAL | ROLL | ROLL SHEET A |
| 000006 | WAITING TO PRINT | NORMAL | ROLL | ROLL SHEET A |
| 000007 | WAITING TO PRINT | NORMAL | ROLL | ROLL SHEET A |
| 000008 | WAITING TO PRINT | HIGH | ROLL | ROLL SHEET A |
| 000009 | WAITING TO PRINT | HIGH | ROLL | ROLL SHEET A |
| 000010 | WAITING TO PRINT | NORMAL | CUT | ROLL SHEET A |
| 000011 | WAITING TO PRINT | NORMAL | CUT | ROLL SHEET A |
| 000012 | WAITING TO PRINT | NORMAL | CUT | ROLL SHEET B |
| 000013 | WAITING TO PRINT | NORMAL | CUT | ROLL SHEET B |
| 000014 | WAITING TO PRINT | NORMAL | CUT | ROLL SHEET B |

FIG. 20B

| JOB ID | STATE | PRIORITY | SHEET DISCHARGE METHOD | ROLL SHEET TO BE USED |
|---|---|---|---|---|
| 000001 | PRINTED | NORMAL | CUT | ROLL SHEET A |
| 000002 | BEING PRINTED | NORMAL | CUT | ROLL SHEET A |
| 000003 | WAITING TO PRINT | NORMAL | ROLL | ROLL SHEET A |
| 000004 | WAITING TO PRINT | NORMAL | ROLL | ROLL SHEET A |
| 000005 | WAITING TO PRINT | NORMAL | ROLL | ROLL SHEET A |
| 000006 | WAITING TO PRINT | NORMAL | ROLL | ROLL SHEET A |
| 000007 | WAITING TO PRINT | NORMAL | ROLL | ROLL SHEET A |
| 000008 | WAITING TO PRINT | NORMAL | ROLL | ROLL SHEET A→B |
| 000009 | WAITING TO PRINT | HIGH | ROLL | ROLL SHEET A→B |
| 000010 | WAITING TO PRINT | HIGH | ROLL | ROLL SHEET A→B |
| 000011 | WAITING TO PRINT | NORMAL | CUT | ROLL SHEET B |
| 000012 | WAITING TO PRINT | NORMAL | CUT | ROLL SHEET B |
| 000013 | WAITING TO PRINT | NORMAL | CUT | ROLL SHEET B |
| 000014 | WAITING TO PRINT | NORMAL | CUT | ROLL SHEET B |

FIG. 20C

| JOB ID | STATE | PRIORITY | SHEET DISCHARGE METHOD | ROLL SHEET TO BE USED |
|---|---|---|---|---|
| 000001 | PRINTED | NORMAL | CUT | ROLL SHEET A |
| 000002 | BEING PRINTED | NORMAL | CUT | ROLL SHEET A |
| 000003 | WAITING TO PRINT | NORMAL | ROLL | ROLL SHEET A |
| 000004 | WAITING TO PRINT | NORMAL | ROLL | ROLL SHEET A |
| 000005 | WAITING TO PRINT | NORMAL | ROLL | ROLL SHEET A |
| 000006 | WAITING TO PRINT | NORMAL | ROLL | ROLL SHEET A |
| 000007 | WAITING TO PRINT | NORMAL | ROLL | ROLL SHEET A |
| 000008 | WAITING TO PRINT | NORMAL | ROLL | ROLL SHEET B |
| 000009 | WAITING TO PRINT | HIGH | ROLL | ROLL SHEET B→A |
| 000010 | WAITING TO PRINT | HIGH | ROLL | ROLL SHEET B→A |
| 000011 | WAITING TO PRINT | NORMAL | CUT | ROLL SHEET B |
| 000012 | WAITING TO PRINT | NORMAL | CUT | ROLL SHEET B |
| 000013 | WAITING TO PRINT | NORMAL | CUT | ROLL SHEET B |
| 000014 | WAITING TO PRINT | NORMAL | CUT | ROLL SHEET B |

FIG. 20E

| JOB ID | STATE | PRIORITY | SHEET DISCHARGE METHOD | ROLL SHEET TO BE USED |
|---|---|---|---|---|
| 000001 | PRINTED | NORMAL | CUT | ROLL SHEET A |
| 000002 | BEING PRINTED | NORMAL | CUT | ROLL SHEET A |
| 000003 | WAITING TO PRINT | NORMAL | ROLL | ROLL SHEET A |
| 000004 | WAITING TO PRINT | NORMAL | ROLL | ROLL SHEET A |
| 000009 | WAITING TO PRINT | HIGH | ROLL | ROLL SHEET A |
| 000010 | WAITING TO PRINT | HIGH | ROLL | ROLL SHEET A |
| 000005 | WAITING TO PRINT | NORMAL | ROLL | ROLL SHEET B |
| 000006 | WAITING TO PRINT | NORMAL | ROLL | ROLL SHEET B |
| 000007 | WAITING TO PRINT | NORMAL | ROLL | ROLL SHEET B |
| 000008 | WAITING TO PRINT | NORMAL | ROLL | ROLL SHEET B |
| 000011 | WAITING TO PRINT | NORMAL | CUT | ROLL SHEET B |
| 000012 | WAITING TO PRINT | NORMAL | CUT | ROLL SHEET B |
| 000013 | WAITING TO PRINT | NORMAL | CUT | ROLL SHEET B |
| 000014 | WAITING TO PRINT | NORMAL | CUT | ROLL SHEET B |

PRINT CONTROL APPARATUS, PRINT CONTROL METHOD, AND NON-TRANSITORY COMPUTER READABLE RECORDING MEDIUM

BACKGROUND

1. Field

Aspects of the present invention generally relate to a print control apparatus, a print control method, and a non-transitory computer readable recording medium storing a program for performing printing using a continuous sheet.

2. Description of the Related Art

In the related art, it is known that when performing printing by using a printing device, a user can interrupt a current job with an urgent job, or an interrupt job, so that a sheet on which the interrupt job is printed can be output as quickly as possible. In addition, there is known a method for performing interrupt printing during duplex printing of a continuous sheet by, subsequently to the printing of the preceding job on the first side of the continuous sheet for duplex printing, printing the interrupt job on the first side, turning over the sheet, and printing the preceding job and the interrupt job on the second side of the continuous sheet for duplex printing (see Japanese Patent Laid-Open No. 2011-201059).

However, the method described in Japanese Patent Laid-Open No. 2011-201059 may fail to quickly provide a print product based on the interrupt job in terms of the output format of the continuous sheet and post-processing steps. For instance, when a continuous sheet subjected to a printing process is not cut but is discharged as is, in some cases, a previous printed portion of the continuous sheet may be wound first and a subsequent printed portion of the continuous sheet may undergo post-processing first.

SUMMARY

According to an aspect of the present invention, a print control apparatus discharges a print product produced by a print unit through printing by using any of a plurality of discharge methods. The print control apparatus includes a first specifying unit configured to specify a priority of an input print job, a second specifying unit configured to specify a discharge method set for the input print job, a determination unit configured to determine an order of printing of the input print job in queued print jobs held in a queue, in accordance with a specifying result of the first specifying unit and a specifying result of the second specifying unit, and a print control unit configured to cause the print unit to execute printing based on the input print job on a continuous sheet in accordance with the order of printing of the print job determined by the determination unit.

Further features of the present disclosure will become apparent from the following description of exemplary embodiments with reference to the attached drawings.

BRIEF DESCRIPTION OF THE DRAWINGS

FIGS. 16A and 16B are illustrations of the rearrangement of jobs according to the embodiment.

FIGS. 17A and 17B are illustrations of the rearrangement of jobs according to the embodiment.

FIGS. 18A to 18C are illustrations of the rearrangement of jobs according to the embodiment.

FIGS. 20A to 20E are illustrations of the rearrangement of jobs according to the embodiment.

DESCRIPTION OF THE EMBODIMENTS

An exemplary embodiment will be described hereinafter with reference to the drawings. In the following exemplary embodiment, the apparatus designs such as the relative arrangement of components of an apparatus and the shape of the apparatus are merely illustrative and are not seen to be limiting.

Figure 1:
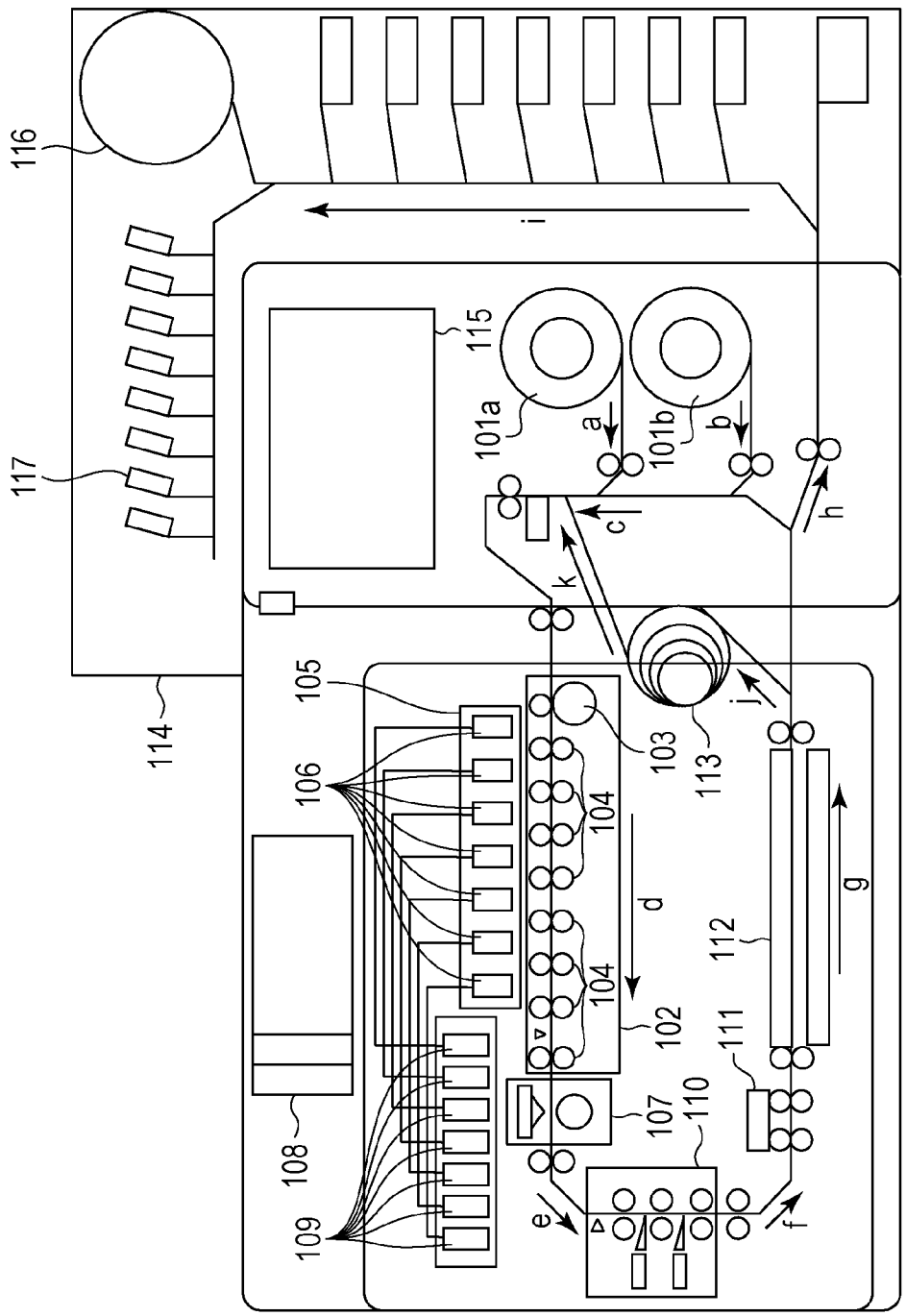
FIG. 1 is a diagram illustrating a configuration of an image forming apparatus according to an embodiment.

FIG. 1 is a diagram illustrating a schematic configuration of an image forming apparatus which may be an example of a print control apparatus according to this embodiment. The image forming apparatus illustrated in FIG. 1 has only a printing function, for illustrative but not limitative purposes. The image forming apparatus may further include a reading device for reading an image on a document to function as a copying machine, or may be a multifunction peripheral having other additional functions. In the following description, a roll sheet is used as a recording medium to be subjected to a printing process (or as a medium on which recording is made or as a recording sheet), by way of example. Any continuous sheet other than a roll-shaped medium may be used. In addition, a continuous sheet may be cut automatically by the image forming apparatus, or may be cut manually in accordance with instructions given by a user. The material of the recording medium is not limited to paper, and any material that can be subjected to a printing process may be used. The image forming apparatus may also be an image forming apparatus configured to perform printing not only using a continuous sheet but also using a cut sheet produced by cutting a continuous sheet to a predetermined size in advance. In addition, the printing method is not limited to an inkjet method that uses image-printing liquid ink, described below, to print an image. A method using solid ink as a recording material or any printing method using toner, such as an electrophotographic printing method or a dye-sublimation printing method, may be used. In addition, the image forming apparatus may not necessarily be configured to perform color recording using recording materials of multiple colors, and may be configured to perform monochrome recording using only a recording material of black (including gray). In addition, the document to be printed is not limited to a visible image, and may be an invisible or indiscernible image. Other examples of the document to be printed may include non-image documents such as a wiring pattern, a physical pattern in the manufacture of a component, and DNA base sequence. That is, the image forming apparatus may be applied to any type of recording device capable of applying a recording material to a recording medium. In addition, in a case where the printing operation of the image forming apparatus illustrated in FIG. 1 is controlled in accordance with instructions given from an external device connected to the image forming apparatus, the external device serves as a print control apparatus.

FIG. 1 is a cross-sectional view illustrating a schematic overall configuration of an image forming apparatus in which a roll sheet that is a continuous sheet continuous and having a longer length in a sheet conveyance direction than the length of a unit of printing (a page) is used as a recording medium. The term "page", which is a unit of printing, is used to include a two-page document produced in the downstream operation, such as a two-page spread. The image forming apparatus includes an upper sheet cassette 101*a*, a lower sheet cassette 101*b*, a conveyance unit 102, a conveyance encoder 103, a plurality of rotation rollers 104, a head unit 105, print heads 106, a scanner unit 107, a control unit 108, ink tanks 109, a cutter unit 110, a back side printing unit 111, a drying unit 112, a sheet winding unit 113, a sorting unit 114, and an operation unit 115, which are disposed in a single housing. The components 101*a* to 115 may be disposed in a plurality of housings.

The control unit 108 includes a built-in control section having a controller (including a central processing unit (CPU) or a microprocessing unit (MPU)), a device for outputting user interface information (or a generator configured to generate information such as display information and acoustic information), and various input/output (I/O) interfaces. The control unit 108 is configured to control the overall operation of the image forming apparatus.

Each of the upper sheet cassette 101*a* and the lower sheet cassette 101*b* is a unit for supplying a roll sheet. A user places a roll sheet (hereinafter referred to as a "sheet") in a magazine and then loads the magazine into the main body of the image forming apparatus. A sheet fed from the upper sheet cassette 101*a* is conveyed in the direction "a" in FIG. 1, and a sheet fed from the lower sheet cassette 101*b* is conveyed in the direction "b" in FIG. 1. The sheet fed from either of the sheet cassettes 101*a* and 101*b* travels in the direction "c" in FIG. 1, and reaches the conveyance unit 102. The conveyance unit 102 conveys the sheet in the direction "d" in FIG. 1 (horizontally) through the plurality of rotation rollers 104 during the printing process. When the sheet cassette from which a sheet is fed is changed from one of the sheet cassettes 101*a* and 101*b* to the other, the currently fed sheet is rewound in the corresponding one of the sheet cassettes 101*a* and 101*b*, and the new sheet is fed from the other sheet cassette. In the image forming apparatus, by way of example, a roll sheet having a roll width of 5 inches, 6 inches, 8 inches, or 12 inches may be set in (or fed from) each of the sheet cassettes 101*a* and 101*b*.

The head unit 105 is disposed above the conveyance unit 102 so as to face the conveyance unit 102. The head unit 105 holds the print heads 106, which are independent and respectively correspond to a plurality of colors (in this embodiment, seven colors), in the sheet conveyance direction. In this exemplary embodiment, the head unit 105 has seven print heads 106 each corresponding to one of seven colors, e.g., cyan (C), magenta (M), yellow (Y), light cyan (LC), light magenta (LM), gray (G), and black (K). It is to be understood that other colors may be used instead or all of the above colors may not necessarily be used. In the image forming apparatus, ink is ejected from the print heads 106 in synchronization with the conveyance of a sheet by the conveyance unit 102 to form an image on the sheet. The print heads 106 are located so that the regions to which ink is ejected from the print heads 106 do not overlap the positions of the rotation rollers 104. Instead of directly ejecting ink onto a sheet, the print heads 106 may be configured to apply ink to an intermediate transfer body before applying the ink onto a sheet to form an image on the sheet. The conveyance unit 102, the head unit 105, and the print heads 106 are incorporated into a printing unit. The ink tanks 109 independently store ink of the respective colors. Ink is supplied from the ink tanks 109 to sub-tanks using tubes. Each of the sub-tanks is disposed so as to correspond to one of the colors. The ink is further supplied from the sub-tanks to the respective print heads 106 using tubes. Each of the print heads 106 has a line heads of the corresponding one of the colors (in this embodiment, seven colors) in the direction "d", which is the sheet conveyance direction during the printing operation. The line heads of the individual colors may be formed of a single seamless nozzle chip or separate nozzle chips arranged in a line or disposed orderly in a staggered arrangement. In this embodiment, a so-called full multi-head is used. In the full multi-head, nozzles are arranged in a range that extends across the entire width of the printable area of a sheet having a maximum size available for the image forming apparatus. An inkjet method in which ink is ejected from a nozzle may be used. Examples of such an inkjet method include a method using a heating element, a method using a piezoelectric element, a method using an electrostatic element, and a method using a microelectromechanical systems (MEMS) element. Ink is ejected from the nozzle of each head in accordance with print data, the timing of which is determined by an output signal from the conveyance encoder 103. This embodiment is not limited to an inkjet printer in which ink is used as a recording material. A printer of any of various printing methods including an electrophotographic method, such as a thermal printer (such as a dye-sublimation printer or a thermal transfer printer), a dot-impact printer, a light-emitting diode (LED) printer, or a laser printer, may be used.

After an image is formed on a sheet, the sheet is conveyed from the conveyance unit 102 to the scanner unit 107. The scanner unit 107 optically reads a printed image or particular pattern on the sheet to check any defect of the printed image or failure in the state of the image forming apparatus including ink ejection defect. In this embodiment, an image check may include checking an ink ejection defect by reading a pattern for checking head conditions, and checking successful printing through comparison with the original image. Any desired one of a variety of check methods may be selected.

The sheet is conveyed in the direction "e" from the vicinity of the scanner unit 107, and is fed into the cutter unit 110. The cutter unit 110 cuts the sheet at the length of a predetermined unit of printing to output the sheet as cut sheets. The term "cut sheet", as used herein, refers to a sheet produced by cutting a continuous sheet into predetermined units of printing such as pages or impressions each having a plurality of pages. The length of the predetermined unit of printing differs depending on the size of the image to be printed. For example, an L-size photograph has a length of 135 mm in the conveyance direction, and an A4-size image has a length of 297 mm in the conveyance direction. In simplex printing, the cutter unit 110 cuts a sheet into predetermined units of printing by default, or may not necessarily cut a sheet into units of printing depending on the content of the print job. In duplex printing, the cutter unit 110 does not cut a sheet into pages after the printing operation has been performed on the first side of the sheet (for example, a front side of the sheet). After images are continuously printed on the first side at a predetermined length and the printing operation is performed on the second side of the sheet (for example, a back side of the sheet), the cutter unit 110 cuts the sheet into predetermined units of printing. The cutter unit 110 may not necessarily be configured to cut a sheet into images in simplex printing or in back-side printing of duplex printing. The cutter unit 110 may be configured not to cut a sheet until the sheet has been conveyed by a predetermined length. After the sheet has been conveyed by the predetermined length, the sheet may be cut by using the cutter unit 110. In this case, the sheet may be cut into images (or pages) by using another cutter device in accordance with manual operation or the like. Additionally, the sheet is cut in the width direction by using a different cutter device, if necessary.

The sheet that has traveled through the cutter unit 110 is conveyed in the direction "f" in FIG. 1 within the image forming apparatus and is fed to the back side printing unit 111. The back side printing unit 111 is a unit configured to print predetermined information onto the back side of the sheet when printing an image onto only one side of the sheet. The information to be printed on the back side of the sheet includes information corresponding to each printed image, such as text, symbols, and codes (e.g., order management numbers). When an image for a print job of duplex printing is printed using the print heads 106, the back side printing unit 111 may print the information described above in an area where the image is printed using the print heads 106. The back side printing unit 111 may use a technology such as imprinting of a recording material, thermal transfer, or inkjet.

The sheet that has traveled through the back side printing unit 111 is then conveyed to the drying unit 112. The drying unit 112 is a unit configured to heat the sheet traveling in the direction "g" in FIG. 1 within the image forming apparatus by using hot air (e.g., heated gas (air)) in order to dry the sheet having ink applied thereto in a short period of time. Instead of drying the sheet using hot air, the drying unit 112 may use any other drying method such as drying the sheet using cold air, heating the sheet using a heater, leaving the sheet to air-dry, or applying an electromagnetic wave such as ultraviolet radiation to the sheet. Cut sheets each having the length of the unit of printing are fed one-by-one through the drying unit 112, and are conveyed in the direction "h" in FIG. 1 to the sorting unit 114. The sorting unit 114 contains a discharge tray unit 117 having a plurality of trays (in this embodiment, 18 trays), and a sheet winding unit 116. The sorting unit 114 is configured to identify the tray to which each cut sheet is to be discharged in accordance with the length of the unit of printing and the like. Each tray has a tray number. The sorting unit 114 discharges a cut sheet traveling in the sorting unit 114 in the direction "i" in FIG. 1 within the image forming apparatus to a tray having a tray number that is set for the image printed on the cut sheet, while checking, using a sensor disposed above each tray, whether the associated tray is empty or filled with sheets. Each cut sheet is discharged to a designated tray. In this case, a print job issuer (a host device) may designate a particular tray as the destination tray, or the image forming apparatus may designate any empty tray as the destination tray. Each tray is capable of receiving a predetermined number of sheets to be discharged. If a print job requires a number of sheets greater than the predetermined number of sheets, the sheets are discharged to a plurality of trays. The number, size, type, and so on of sheets that can be discharged to each tray differs from the size (or type) and the like of the tray. In FIG. 1, a group of trays arranged vertically (or up and down) (hereinafter referred to as the "large trays") is capable of receiving both large sheets (sheets larger than L-size sheets, such as A4-size sheets) to be discharged and small sheets (L-size sheets) to be discharged. A group of trays arranged horizontally (to the right and left) (hereinafter referred to as the "small trays") is capable of receiving small sheets (L-size sheets) to be discharged but is not capable of receiving large sheets to be discharged. The number of output sheets that can be discharged to the large trays is larger than the number of output sheets that can be discharged to the small trays. In addition, the user is notified of sheet discharge states by using an indicator (such as an LED) so that the user can identify the current state such as the discharge of sheets in progress or completion of discharge of sheets. For example, each tray may be provided with a plurality of LEDs that emit light of different colors so that the user can be notified of various states of the tray by using the color of a lit LED or by using the state of an LED such as whether the LED is lit or blinking. In addition, each of the plurality of trays may be given a priority. When executing a print job, the image forming apparatus designates empty trays (trays in which no sheets are present) as trays to which sheets are to be discharged in order according to the priority. In the default settings, a tray located at a higher position in the large trays has a higher priority, and a tray located more leftward in the small trays has a higher priority. In addition, the priority of the small trays is higher than that of the large trays. A higher priority may be allocated to a tray located at a position that allows the user to more easily remove sheets. The priority order may be changed by a user operation or the like.

The sheet winding unit 113 winds a sheet that has an image printed on a front side thereof and that has not been cut into predetermined units of printing. When cut sheets are to be discharged in duplex printing, a sheet having an image first formed on the front side thereof is not cut into predetermined units of printing by the cutter unit 110, but is cut after images have been continuously printed on the front side of the sheet. When a continuous sheet is to be discharged in duplex printing, on the other hand, a sheet is cut after images have been continuously printed on the front side of the sheet, but is not cut after an image is printed on the back side of the sheet. The sheet having an image printed on the front side thereof travels in the direction "j" in FIG. 1 within the image forming apparatus, and is wound by the sheet winding unit 113. Then, the sheet, which has been wound after images for a sequence of pages have been formed on the front side of the sheet, is conveyed in the direction "k" in FIG. 1 with the side opposite to the front side being made available for printing, that is, with the side that will face the print heads 106 being turned upside down. Conveying the sheet in the way described above allows an image to be printed on the back side of the sheet, which is opposite to the front side. In standard simplex printing, a sheet having an image printed thereon is conveyed to the sorting unit 114 without being wound by the sheet winding unit 113.

In the way described above, in duplex printing, a sheet is wound using the sheet winding unit 113, and is turned over before an image is printed on the back side of the sheet. Thus, the face-up side of the sheet discharged to the discharge tray unit 117 in the sorting unit 114 in simplex printing is different from that in duplex printing. Specifically, in simplex printing, since the sheet is not turned over using the sheet winding unit 113, the sheet on which the image on the first page has been printed is discharged in such a manner that the image on the first page faces down. In a case where one print job has a plurality of pages, the sheets are sequentially discharged onto a tray, starting from the first page to the last page, so that the sheets are stacked upon one another. This sheet discharge method is referred to as face-down discharge. In duplex printing, on the other hand, since the sheet is turned over using the sheet winding unit 113, the sheet on which the image on the first page has been printed is discharged in such a manner that the image on the first page faces up. In a case where one print job is a job for outputting a plurality of sheets, the sheets are sequentially discharged onto a tray, starting from the last page to the first page, so that the sheets are stacked upon one another, and the sheet on which the image on the first page has been printed is finally discharged. This sheet discharge method is referred to as face-up discharge.

The operation unit 115 is a unit used by a user to perform a variety of operations or configured to notify the user of a variety of types of information. The operation unit 115 includes a hard key and a touch panel through which the user performs a variety of operations. The operation unit 115 further includes a display unit for providing the user with a variety of types of information (or notifying the user of a variety of types of information). The information may also be provided to the user using an acoustic alarm (such as a buzzer or sound) output from an audio generator based on acoustic information. In addition, the user may be able to check printing status, order-by-order, such as which tray a sheet on which the image specified by the user has been printed is fed to, or whether the printing of the image is in progress or has been completed. The user may also be able to check various device states such as the remaining ink level or the length of a remaining portion of the sheet, in order to instruct maintenance of the image forming apparatus such as head cleaning. In addition, the user may be able to register the size (roll width), length, and type (material or processed form of a sheet such as plain paper, glossy paper, coated paper, or film) of a roll sheet set in each of the sheet cassettes 101a and 101b into a built-in memory using the operation unit 115.

The sheet winding unit 116 is a unit configured to wind a printed sheet. In a case where a printed sheet is discharged as a continuous sheet without being cut by the cutter unit 110, the sheet is wound by the sheet winding unit 116.

Figure 2:
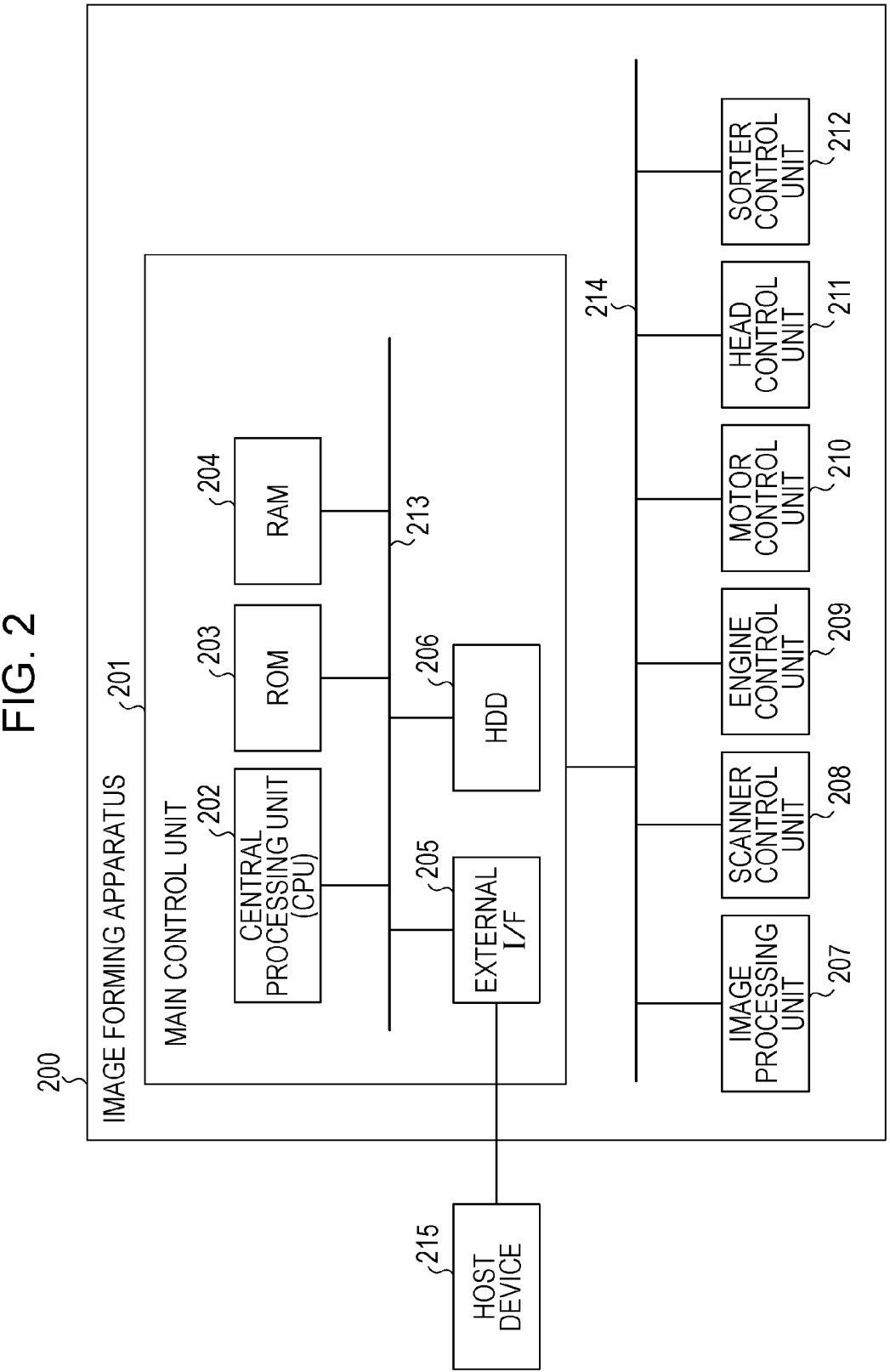
FIG. 2 is a block diagram of the image forming apparatus according to the embodiment.

The discharge tray unit 117 is a unit to which a sheet cut by the cutter unit 110 is discharged. In the manner described above, the sorting unit 114 sorts sheets so that each of the sheets is discharged to the sheet winding unit 116 or the discharge tray unit 117. In this embodiment, the discharge tray unit 117 and the cutter unit 110 are provided. Thus, in a case where a large amount of content is printed on a sheet using the sheet winding unit 116, that is, in a case where a sheet having print data printed thereon is discharged as a continuous sheet, proof print data may be inserted. Specifically, only a proof image is output to the discharge tray unit 117, and the sheet having print data printed thereon is again output to the sheet winding unit 116. Proof printing is a kind of test printing to ensure the printing quality. A user performs test printing, before starting the desired print job, using the same print settings (except for the number of prints) as those for the desired print job to judge whether to execute the print job. In this embodiment, unlike the related art, proof printing is not performed using a different printer nor is printed a set of proofs alone, enabling efficient proof printing. FIG. 2 is a block diagram depicting a control configuration of the image forming apparatus illustrated in FIG. 1. An image forming apparatus 200 illustrated in FIG. 2 corresponds to the image forming apparatus illustrated in FIG. 1.

The image forming apparatus 200 illustrated in FIG. 2 includes, in the control unit 108 thereof, a main control unit 201, an image processing unit 207, a scanner control unit 208, an engine control unit 209, a motor control unit 210, a head control unit 211, and a sorter control unit 212, which are configured to communicate with one another via a system bus 214.

The main control unit 201 includes a central processing unit (CPU) 202, a read only memory (ROM) 203, a random access memory (RAM) 204, an external interface (I/F) 205, and a hard disk drive (HDD) 206, which are configured to communicate with one another via a system bus 213. The main control unit 201 controls the overall operation of the image forming apparatus 200.

The CPU 202 is a central processing unit having a microprocessor (or a microcomputer), and executes a program or activates hardware to control the overall operation of the image forming apparatus 200. The ROM 203 stores a program that the CPU 202 executes, and also stores fixed data necessary for various operations of the image forming apparatus 200. The RAM 204 is used as a work area for the CPU 202, or as a temporary storage area for various kinds of received data, or is configured to store various kinds of setting data. The external I/F 205 is configured to connect an external device to the image forming apparatus 200. The external I/F 205 may be a local I/F or a network I/F. In addition, the external I/F 205 may be connected via wired or wireless connections. The HDD 206 is configured to store a program that the CPU 202 or the like executes, print data, and setting information necessary for various operations of the image forming apparatus 200 in a built-in hard disk or to read desired data from the hard disk. When a print job is received as input, the CPU 202 sets an ID for identifying the received print job in a job queue that serves as a print job holder in the HDD 206, and manages the order of printing on the basis of the ID. Any other large-capacity storage device other than the HDD 206 may be used.

The image processing unit 207 performs various image processing operations including the expansion (or conversion) of print data (for example, data or an image file expressed in page description language) that the image forming apparatus 200 handles into image data (bitmap image). The image processing unit 207 converts the color space (for example, YCbCr) of image data included in the input print data into a standard red-green-blue (RGB) color space (for example, sRGB). In addition, the image processing unit 207 performs various image processing operations on the image data, if necessary. Examples of the image processing operations may include resolution conversion into the number of effective pixels (available for printing by the image forming apparatus 200), image analysis, and image correction. The image data obtained as a result of the image processing operations is stored in an internal RAM, the RAM 204, or the HDD 206. Similarly to the main control unit 201, the image processing unit 207 includes a CPU, a ROM, and a RAM, which are connected to one another via a system bus, and the CPU executes the image processing operations described above in accordance with a program stored in the ROM.

The scanner control unit 208 controls an image sensor in accordance with a control command received from the CPU 202 or the like, reads an image on a sheet, and acquires red (R), green (G), and blue (B) luminance values. The image sensor may be a charge-coupled device (CCD) image sensor, a complementary metal-oxide semiconductor (CMOS) image sensor, or the like. The image sensor may also be a linear image sensor or an area image sensor. The scanner control unit 208 acquires the state of the image sensor in accordance with instructions to drive the image sensor and the driving of the image sensor, and analyzes the luminance data acquired from the image sensor to detect non-ejection of ink from the print heads 106, a sheet cutting position, and so on. A sheet on which the scanner control unit 208 determines that an image has been correctly printed is subjected to an ink drying process, and is then discharged onto a designated tray in the sorting unit 114. Similarly to the main control unit 201, the scanner control unit 208 also includes a CPU, a ROM, and a RAM, which are connected to one another via a system bus, and the CPU executes the reading process described above in accordance with a program stored in the ROM.

The engine control unit 209 performs control to print an image based on print data on a sheet in accordance with a control command received from the CPU 202 or the like. In the printing process, the engine control unit 209 controls the head control unit 211, the motor control unit 210, the scanner control unit 208, and the sorter control unit 212 to execute a series of printing process steps. That is, the engine control unit 209 performs control to apply ink to a sheet using the print heads 106, convey the sheet, determine whether an image has been successfully printed on the sheet by using an image sensor, and sort the sheet using a tray in the sorting unit 114. The engine control unit 209 transmits and receives a control command, various data, a status signal, and so on to and from the main control unit 201 via the system bus 214. Similarly to the main control unit 201, the engine control unit 209 also includes a CPU, a ROM, and a RAM, which are connected to one another via a system bus, and the CPU controls the printing process described above in accordance with a program stored in the ROM.

The motor control unit 210 provides instructions to drive a sheet feed roller and instructions to drive a conveyance roller in accordance with a control command received from the engine control unit 209, and controls a motor to activate the sheet feed roller and the conveyance roller. In addition, the motor control unit 210 performs operations such as acquiring the rotation state of the conveyance roller, causes the sheet to travel at an appropriate speed along a path and to stop, and further measures the distance at which the sheet has traveled. Similarly to the main control unit 201, the motor control unit 210 also includes a CPU, a ROM, and a RAM, which are connected to one another via a system bus, and the CPU controls the motor related processes described above in accordance with a program stored in the ROM.

The head control unit 211 performs operations such as instructing the print heads 106 of the respective colors to eject ink, setting the ejection timing to adjust the dot positions (or ink drop positions) on the recording medium, and performing adjustment based on the acquired head driving state. The head control unit 211 performs control to drive the print heads 106 on the basis of print data in accordance with a control command received from the engine control unit 209 to eject ink from the print heads 106 to form an image on the sheet. Similarly to the main control unit 201, the head control unit 211 also includes a CPU, a ROM, and a RAM, which are connected to one another via a system bus, and the CPU controls the processes described above using the print heads 106 In accordance with a program stored in the ROM.

The sorter control unit 212 performs control to perform operations, such as specifying the path along which a sheet is to travel and providing instructions to switch between trays, in accordance with a control command received from the engine control unit 209 to discharge a sheet to each tray in the sorting unit 114. The sorter control unit 212 is also configured to be capable of detecting the presence or absence of sheets on each tray in accordance with the output of a sheet detection sensor in the tray. Similarly to the main control unit 201, the sorter control unit 212 also includes a CPU, a ROM, and a RAM, which are connected to one another via a system bus, and the CPU controls the processes described above using the sorting unit 114 in accordance with a program stored in the ROM.

A host device 215 corresponds to the external device described above, and is a device externally connected to the image forming apparatus 200 and serving as a supply source of image data to be printed by the image forming apparatus 200. The host device 215 issues a variety of print job orders. The host device 215 may be implemented as a general-purpose personal computer (PC) or as any other type of data supply device. Examples of the other type of data supply device include an image capture device configured to capture an image to generate image data. Examples of the image capture device include a reader (or scanner) configured to read an image on a document to generate image data, and a film scanner configured to read a negative film or a positive film to generate image data. Other examples of the image capture device include a digital camera configured to capture a still image to generate digital image data, and a digital video camera configured to capture a moving image to generate video data. The host device 215 may also be configured to host a photo storage site on a network or may be provided with a socket to which a removable portable memory is connected, so as to read an image file stored in the photo storage site or the portable memory to generate image data to print the image file. The host device 215 may be any data supply device, instead of a general-purpose PC, such as a terminal dedicated to the image forming apparatus 200. Such a data supply device may be a component of the image forming apparatus 200 or a separate device that is externally connected to the image forming apparatus 200. In a case where the host device 215 is implemented as a PC, an operating system (OS), application software for generating image data, and a printer driver for the image forming apparatus 200 are installed in a storage device of the PC. The printer driver controls the image forming apparatus 200, or converts image data supplied from application software into a format executable by the image forming apparatus 200 to generate print data. In addition, the host device 215 may convert print data into image data and then supply the image data to the image forming apparatus 200. Note that all the processes described above may not necessarily be implemented by software and some or all of the processes may be implemented by hardware. The image data supplied from the host device 215, other commands, status signals, and the like may be transmitted to and received from the image forming apparatus 200 via the external I/F 205.

In the example described above, for illustrative but not limitative purposes, each of the function blocks includes a CPU. Some of the function blocks may not include a CPU and may operate under control of the main control unit 201 or under control of the main control unit 201 and the engine control unit 209. In addition, each function block may have a variety of forms. For example, the function blocks may be divided into separate processing units or control units, as desired, depending on the method by which the function blocks share the operations, other than the configuration illustrated in FIG. 2. Alternatively, some of the function blocks may be combined. In addition, data may be read from a memory using a direct memory access controller (DMAC).

Figure 3:
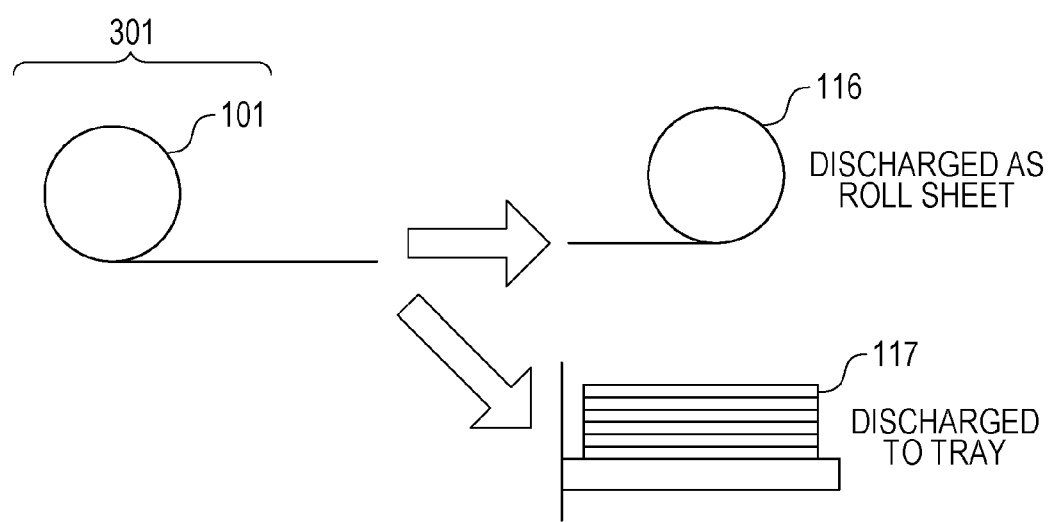
FIG. 3 is an illustration of a sheet feed unit and a sheet discharge unit according to the embodiment.

FIG. 3 depicts a sheet feed unit and a sheet discharge unit according to this embodiment. As illustrated in FIG. 3, a sheet feed unit 301 includes a sheet cassette 101. In FIG. 3, one of the sheet cassettes 101a and 101b is illustrated by way of example. A sheet discharge unit includes the sheet winding unit 116 in the sorting unit 114 for discharging a roll sheet, and the discharge tray unit 117 for discharging a cut sheet. That is, as illustrated in FIG. 3, in this embodiment, a continuous sheet is fed as sheet-shaped paper from the sheet feed unit 301, and is cut and discharged onto a tray as a cut sheet or is discharged as is. In a case where the continuous sheet is discharged as is, the sheet is discharged as a web that is wound in roll form in the sheet winding unit 116. In this embodiment, the term "cut sheet" refers to a piece obtained by cutting a sheet at a size at which the piece can be discharged to a tray discharge unit. Examples of the cut sheet include a cut sheet having a predetermined unit of printing. In this embodiment, cut sheets and a roll sheet are obtained from a single continuous sheet supplied from the sheet cassette 101 serving as a sheet feed unit in accordance with the settings and the like of the print data. The cut sheets are discharged onto a tray or trays, and the roll sheet is formed by winding the continuous sheet into a web roll. In other words, in this embodiment, a sheet is discharged from a single sheet feed unit to two different types of sheet discharge units (that is, a roll-sheet discharge unit and a tray discharge unit).

Here, how a print product produced through printing based on a print job is discharged (hereinafter also referred to as the "sheet discharge method") may be set in the print job in advance or may be set by a user using the operation unit 115 or the like.

Figure 4:
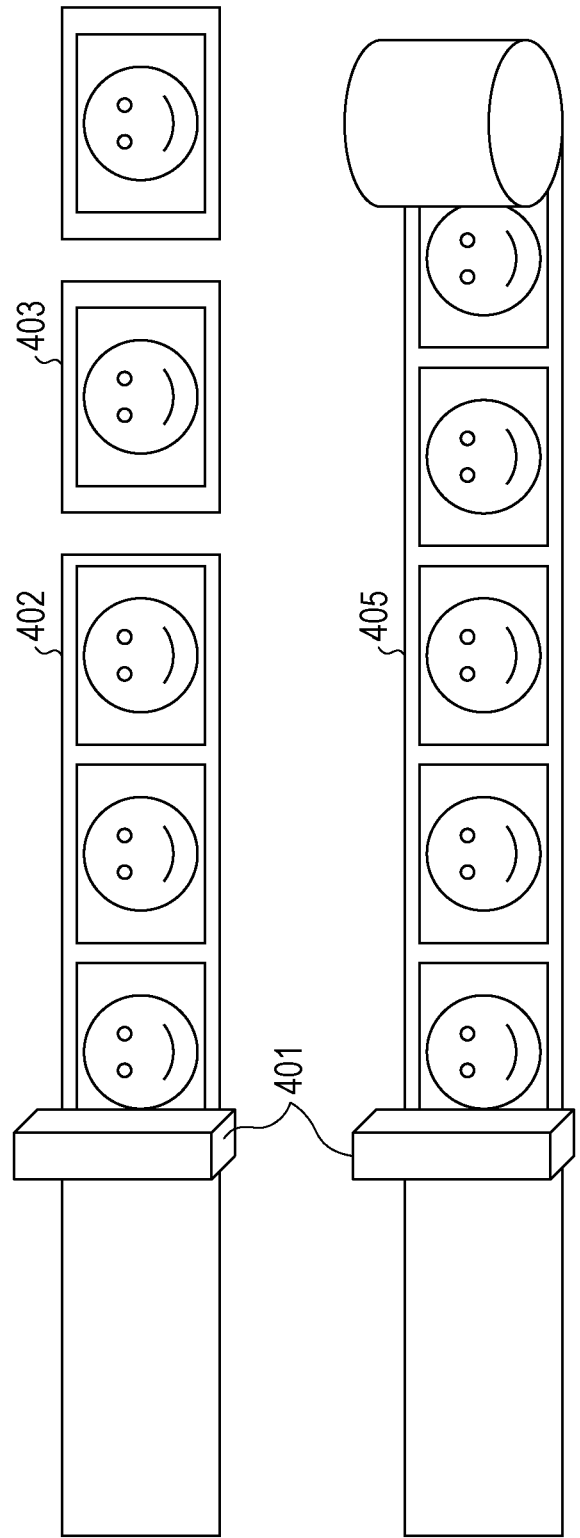
FIG. 4 is an illustration of the discharge of a continuous sheet as cut sheets and the discharge of a continuous sheet as is.

A method for processing a printed continuous sheet will be described with reference to FIG. 4. FIG. 4 depicts the discharge of a printed continuous sheet as cut sheets and the discharge of a printed continuous sheet as a continuous sheet.

In FIG. 4, a printing unit 401 is illustrated. The printing unit 401 includes the head unit 105, the print heads 106, and the ink tanks 109, which are illustrated in FIG. 1. In FIG. 4, image views 402, 403, and 405 of a printed sheet are also illustrated. The image view 402 depicts a printed sheet that will be cut, and the image view 403 depicts a cut printed sheet. As illustrated in FIG. 4, a print job for which sheet cutting is set is printed on a sheet by the printing unit 401, and the sheet is then cut into pieces by the cutter unit 110 or the like. The pieces of the cut sheet, each having a predetermined length, are discharged to a tray discharge unit. On the other hand, a print job for which sheet cutting is not set is printed on a sheet by the printing unit 401, and the sheet is then discharged without being cut by the cutter unit 110 or the like. As illustrated in FIG. 4, a printed portion of the sheet is wound by the sheet winding unit 116. Also in a case where the sheet discharge method is roll discharge in which a printed sheet is discharged to the roll-sheet discharge unit (hereinafter also referred to as "continuous-sheet discharge"), the sheet may be cut by the cutter unit 110 or the like at a certain length, for example, to a length longer than a predetermined unit of printing, in accordance with the setting of the print job. In a case where, for example, data is collected for each customer who is provided with a print product or the print product is to be divided into a predetermined number of print jobs, a continuous sheet is cut into units in which a customer is provided with the print product or into sets each having a predetermined number of print jobs. The continuous sheet is wound by the sheet winding unit 116.

The sheet winding unit 113 is used for winding a sheet into a web roll for duplex printing, but is not used for winding a finally discharged sheet into a web roll.

Figure 19A:
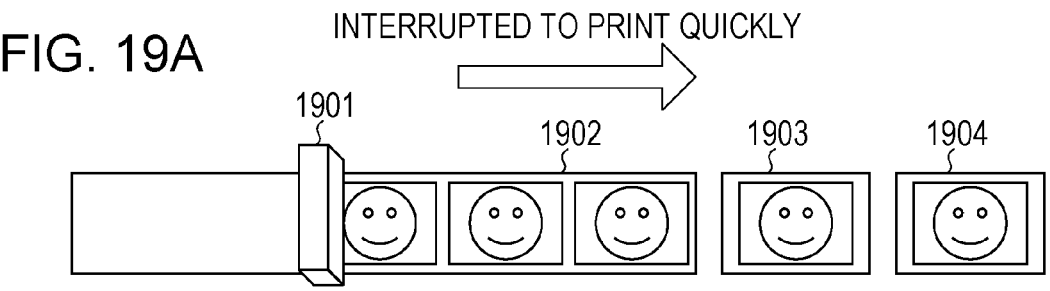
FIGS. 19A to 19D are diagrams illustrating a downstream operation for a printed sheet.

A rearrangement process according to this embodiment will be described with reference to FIGS. 19A to 19D. FIGS. 19A to 19D are diagrams illustrating a downstream operation for a printed sheet. FIG. 19A depicts the cut-sheet discharge of a job printed on a continuous sheet. In the case of cut-sheet discharge, a printing unit 1901 performs printing on a continuous sheet to produce a printed continuous sheet 1902, and the printed continuous sheet 1902 is cut before being discharged. Thus, cut sheets 1903 and 1904 are output. In this manner, in a case where cut sheets are output (when the discharge method is cut-sheet discharge), a portion located more rightward in FIG. 19A, or a portion located closer to the leading end of the printed sheet, is processed earlier. That is, of the images 1903 and 1904, the image 1904 is printed earlier. Accordingly, in the case of cut-sheet discharge, a job is interrupted with a high-priority job so that the high-priority job can be printed as early as possible, thereby achieving output of jobs according to the priority.

Figure 19B:
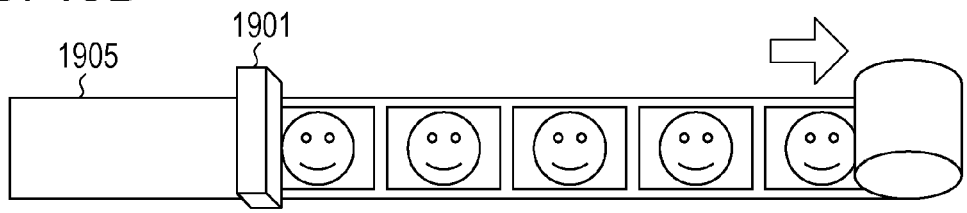
Figure 19C:
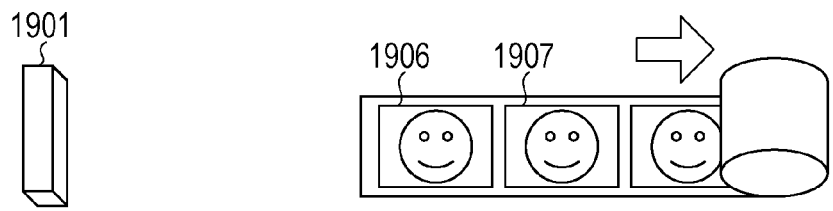
Figure 19D:
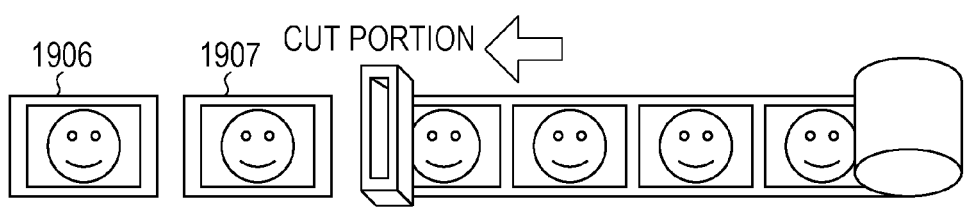

FIGS. 19B to 19D depict the roll-sheet discharge of a job printed on a continuous sheet. As illustrated in FIG. 19B, in the case of roll-sheet discharge, the printing unit 1901 performs printing on a continuous sheet, and printed portions of the printed continuous sheet are sequentially wound in order (see the right side of FIGS. 19B and 19C). In the case of roll-sheet discharge, unlike cut-sheet discharge, cut products are not obtained until the continuous sheet is cut in the downstream operation. In the case of cut-sheet discharge, of images 1906 and 1907, the image 1907 has higher priority and is obtained earlier. In the case of roll-sheet discharge, in contrast, as illustrated in FIG. 19D, the image 1906 is obtained earlier as a product. In the manner described above, by changing the position of the job that is interrupted with a high-priority job in accordance with the sheet discharge method, it may be possible to quickly create a product. In this embodiment, accordingly, a high-priority job is printed as early as possible in the case of cut-sheet discharge, whereas a high-priority job is printed as late as possible in the case of roll-sheet discharge. Thus, a print product may be obtained immediately after a high-priority job has been printed.

Figure 5:
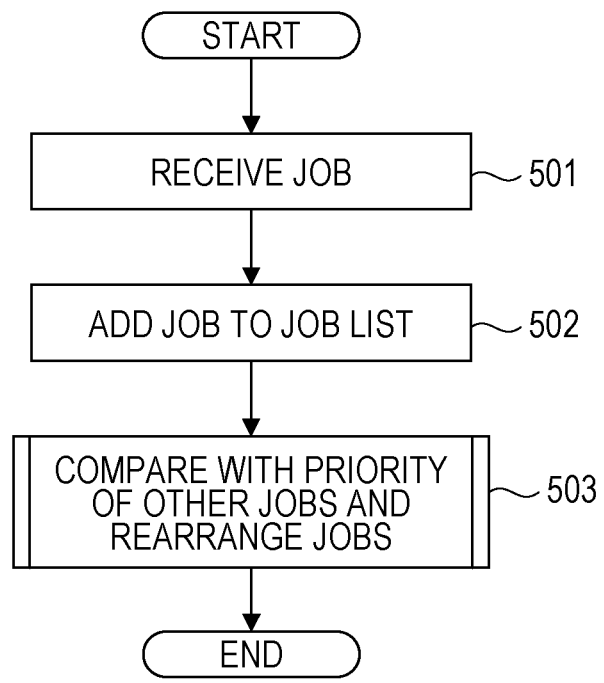
FIG. 5 is a flowchart illustrating the flow of a printing process according to the embodiment.

Here, a description will be given of the flow of a process for executing a print job using the image forming apparatus 200. FIG. 5 is a flowchart illustrating the flow of a process for receiving a print job and executing the print job using the image forming apparatus 200. The flowchart illustrates the flow of a process performed when the CPU 202 of the main control unit 201 loads a control program stored in the ROM 203 or the HDD 206 into the RAM 204 and executes the control program. It is assumed that the size (roll width) and type (such as plain paper, glossy paper, or film) of the sheet set in each of the sheet cassettes 101a and 101b are registered in the RAM 204 in accordance with a user operation using the operation unit 115.

In S501, upon receipt of a print job from the host device 215 via the external I/F 205, the CPU 202 starts the process of the print job. The received print job is temporarily accumulated in the HDD 206. Then, in S502, the CPU 202 adds the received print job to a job list. The job list is a list of jobs to be printed by the image forming apparatus 200 and is displayed on the operation unit 115, the details of which will be described below.

Then, in S503, the CPU 202 compares the priority of the received job with the priority of the other jobs that have been stored, and rearranges the jobs.

A method for setting each job will be described with reference to FIGS. 15A to 15D. FIGS. 15A to 15D are diagrams illustrating an example of setting screens for various settings of each job. The setting screens illustrated in FIGS. 15A to 15D are displayed on, for example, the operation unit 115.

Figure 15A:
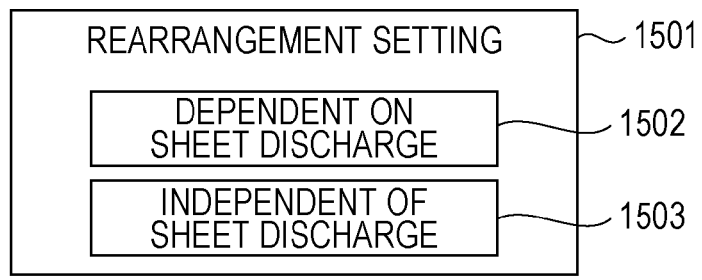
FIGS. 15A to 15E are diagrams illustrating an example of setting screens for various settings of each job according to the embodiment.

FIG. 15A illustrates a screen for performing the job rearrangement setting. A rearrangement setting screen 1501 has buttons for selecting rearrangement conditions. In this embodiment, the rearrangement setting screen 1501 has a "Dependent on sheet discharge" button 1502, and an "Independent of sheet discharge" button 1503. When the button 1502 is selected, the setting dependent on the sheet discharge method is performed. When the button 1503 is selected, the setting for rearranging jobs independent of the sheet discharge method is performed. The selected condition is used in FIG. 6 described below.

Figure 15B:
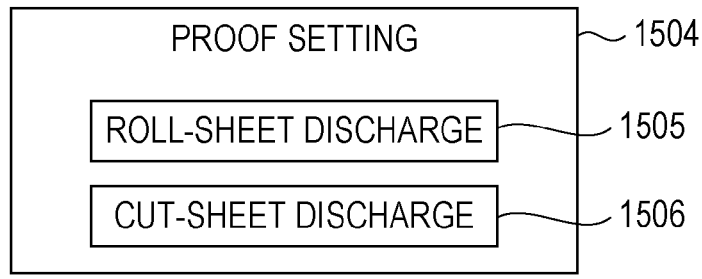

FIG. 15B illustrates a screen for setting a sheet discharge method for a proof job. A proof-job sheet discharge method setting screen 1504 has a roll-sheet discharge button 1505, and a cut-sheet discharge button 1506. When the button 1505 is selected, the proof job is set so that roll-sheet discharge is performed. When the button 1506 is selected, the proof job is set so that cut-sheet discharge is performed.

Figure 15C:
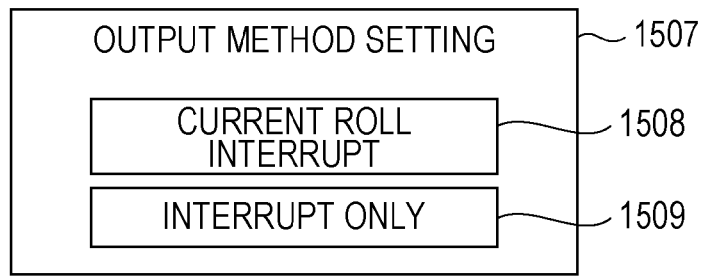

FIG. 15C illustrates a screen for setting an interrupt method. An interrupt-method setting screen 1507 has a "Current roll interrupt" button 1508 and an "Interrupt only" button 1509. When the button 1508 is selected, a remaining portion of the sheet is detected, and the operation of interrupting the current job for a roll sheet to be output with a high-priority job is performed. When the button 1509 is selected, only the interrupt priority is determined regardless the length of the detected remaining portion of the sheet, and jobs are rearranged. The term "interrupt job" refers to a job having a higher priority than other jobs.

Figure 15D:
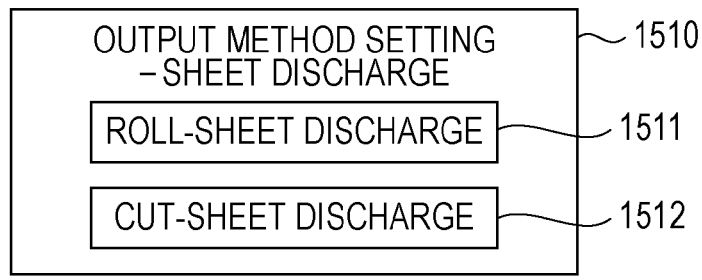

FIG. 15D illustrates a screen for setting an interrupt-job output method when the current roll interrupt setting is performed in the output method setting. The setting screen illustrated in FIG. 15D is displayed when the "Current roll interrupt" button 1508 is selected in the screen illustrated in FIG. 15C. An output method setting screen 1510 has a roll-sheet discharge button 1511, and a cut-sheet discharge button 1512. When the button 1511 is selected, the sheet discharge method for the target job is set to roll-sheet discharge. When the sheet discharge method for the button 1512 is selected, the target job is set to cut-sheet discharge.

Figure 6:
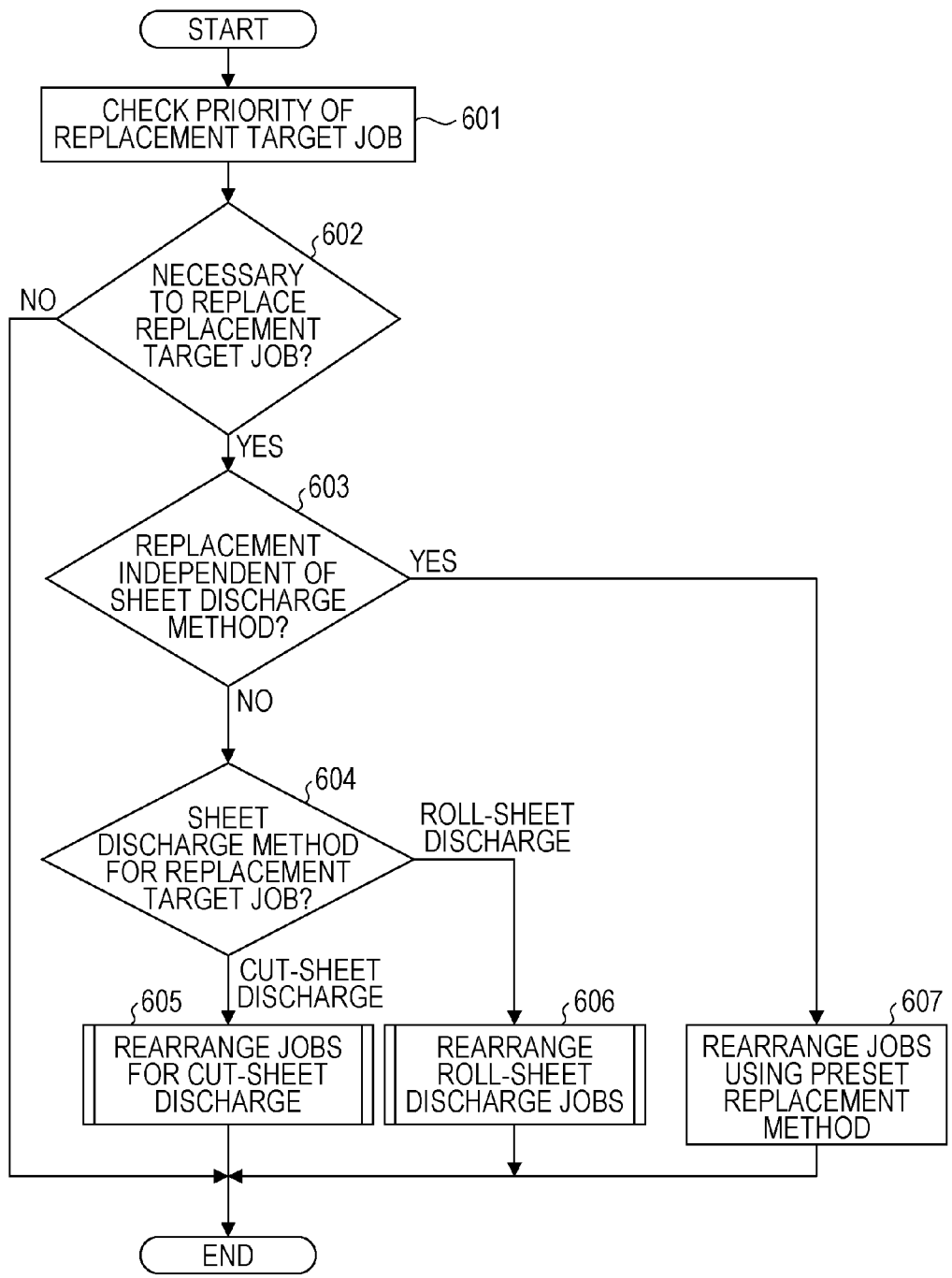
FIG. 6 is a flowchart illustrating the flow of a process for rearranging jobs according to the embodiment.
Figure 15E:
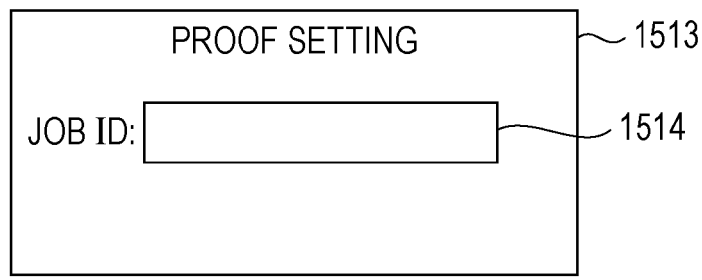

FIG. 15E illustrates a screen for setting a proof. The term "proof" refers to an operation for checking the printing quality, such as brightness and color dye penetration, before starting the final printing process. A proof job is handled in a manner equivalent to that for the original job (or the final job) that is stored, and is printed separately from the final job. In order to proof a job, a proof job is entered using the screen. A proof setting screen 1513 has a job ID input field 1514 for entering the ID of a job to be proofed. When the ID of a job to be proofed is entered, the job to be proofed is identified. Accordingly, the proof job is entered into the image forming apparatus. The proof job is entered as a job separate from the original job (or the final job) to be proofed. FIG. 6 illustrates an example of the flow of the details of S503. That is, FIG. 6 illustrates an example of the flow of a job rearrangement process.

First, the CPU 202 checks the priority of the current job (S601). The current job is a job which is received and added to the job list and for which it is determined whether or not replacement with another job will occur. The current job is hereinafter also referred to as the "replacement target job". The term "replacement", as used herein, refers to a change of an order of printing of the queued print jobs.

Then, the CPU 202 compares the priority of the replacement target job with the priority of other jobs to determine whether or not to replace the replacement target job (S602). The term "other jobs", as used herein, refers to jobs that have been received by the image forming apparatus 200 but have not yet been printed. That is, the received but yet-to-be-printed other jobs might be replaced with the replacement target job. When the priority of the replacement target job is higher than that of the other jobs, it is determined that replacement is necessary. If replacement is not necessary, the process ends. If it is determined that replacement is necessary, the process proceeds to S603.

In S603, the CPU 202 determines whether or not to perform replacement independent of the sheet discharge method, in accordance with the setting of the print job, that is, in accordance with the determination result in S602. In this embodiment, the setting independent of the sheet discharge method can be performed using the setting screen illustrated in FIG. 15A. For the setting of replacement independent of the sheet discharge method, the CPU 202 determines that replacement independent of the sheet discharge method is performed. Then, the process proceeds to S607. On the other hand, for not the setting of replacement independent of the sheet discharge method, the CPU 202 determines that replacement independent of the sheet discharge method is not performed, and then the process proceeds to S604.

In S607, the CPU 202 performs replacement using a preset replacement method. In this embodiment, jobs are sorted in accordance with the result of simply comparing priorities, and rearranged. Then, the process ends.

In S604, the CPU 202 determines the type of the sheet discharge method for the replacement target job. If the sheet discharge method for the replacement target job is cut-sheet discharge, the process proceeds to S605. If the sheet discharge method for the replacement target job is roll-sheet discharge, the process proceeds to S606.

In S605, the CPU 202 rearranges jobs in the case of the cut-sheet discharge of the replacement target job. The details will be described below with reference to FIGS. 9 and 10. After the jobs are rearranged, the process ends.

In S606, the CPU 202 rearranges jobs in the case of the roll-sheet discharge of the replacement target job. The details will be described below with reference to FIGS. 7 and 8. After the jobs are rearranged, the process ends.

FIGS. 16A, 16B, 17A, 17B, and 18A to 18C illustrate an example of job list screens displayed on the operation unit 115. A job list shows information on each job. Examples of such information on each job include a job ID, a state, a priority, and a sheet discharge method. Other additional information, such as a roll sheet to be used, is also displayed as job information, if necessary. The job ID is information for identifying a job. In this embodiment, IDs are assigned to jobs in the order in which they are entered. The states of print jobs include printed, printing in progress (also referred to as "being printed"), and waiting to print (hereinafter also referred to as "queued"). In addition, by way of example, two priority levels, e.g., "normal priority" and "high priority", can be set, where a job with "high priority" has a higher priority than a job with "normal priority".

FIGS. 16A and 16B illustrate an example of the display of a list of jobs entered into the image forming apparatus 200. In the illustrated example, replacement target jobs for both roll-sheet discharge and cut-sheet discharge are illustrated. FIG.

16A illustrates a list of jobs that have not been rearranged, that is, a list of jobs that are arranged in input order. The jobs having ID000005, ID000007, and ID000014 have higher priority than the other jobs. In this embodiment, the jobs displayed in the job list illustrated FIG. 16A are rearranged in the order illustrated in FIG. 16B. Note that the job that has been printed and the job that is being printed are not used as targets for rearrangement. First, since the job having ID000005 is a job for cut-sheet discharge, the jobs are rearranged so that the job having ID000005 is printed earliest of all the jobs for cut-sheet discharge that are waiting to print. Specifically, the jobs having ID000003 to ID000006, which are jobs for cut-sheet discharge, are rearranged so that the job having ID000005 is placed before the job having ID000003. The job having ID000007 is a job for roll-sheet discharge, and is thus placed so as to be printed latest of all the jobs for roll-sheet discharge that are waiting to print. Specifically, the jobs having ID000007 to ID000010, which are jobs for roll-sheet discharge, are rearranged so that the job having ID000007 is placed after the job having ID000010. In addition, the job having ID000014 is a job for cut-sheet discharge, and is thus placed so as to be printed earliest of the jobs for cut-sheet discharge that are waiting to print. Specifically, the jobs having ID000011 to ID000014, which are jobs for cut-sheet discharge, are rearranged so that the job having ID000014 is placed before the job having ID000011.

FIGS. 17A and 17B illustrate an example of the display of a list of jobs entered in the image forming apparatus 200. In the illustrated example, replacement target jobs for roll-sheet discharge are illustrated. FIG. 17A illustrates a list of jobs that have not been rearranged, that is, a list of jobs that are arranged in input order. The jobs having ID000005 and ID000007 have higher priority than the other jobs. In this embodiment, the jobs displayed in the job list illustrated in FIG. 17A are rearranged in the order illustrated in FIG. 17B. Specifically, the jobs having ID000005 to ID000010, which are jobs for roll-sheet discharge, are rearranged so that the jobs having ID000005 and ID000007 are placed after the job having ID000010. The arrangement order of the jobs having ID000005 and ID000007 is not limited to that in the illustrated example. For example, in a case where the jobs are rearranged starting from the job having ID000007, the jobs having ID000007 and ID000005 may be arranged in this order, or, if the jobs having ID000005 and ID000007 have different priorities, the jobs having ID000005 and ID000007 may be arranged in accordance with the priority order.

Figure 18A:
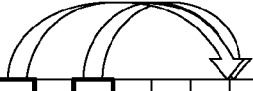
Figure 18B:
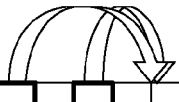

FIGS. 18A to 18C depict an example of the display of a list of jobs entered into the image forming apparatus 200, in which jobs are rearranged. In the illustrated example, replacement target jobs for roll-sheet discharge are illustrated. In FIGS. 18A to 18C, the job list shows a job ID, a state, a priority, a sheet discharge method, and a roll sheet to be used. In FIGS. 18A to 18C, the job having ID000005 and the job having ID000007 have higher priority than any other queued job. Note that the roll sheets to be used A and B are roll sheets of the same type but are different rolls. In a case where replacement is performed independent of the roll sheet to be used, for example, in response to the selection of the button 1509 on the setting screen illustrated in FIG. 15C, the jobs are rearranged in the order illustrated in FIG. 18A. Specifically, the jobs having ID000005 to ID000010, which are jobs for roll-sheet discharge, are rearranged so that the jobs having ID000005 and ID000007 are placed after the job having ID000010. In this case, the jobs having ID000005 and ID000007 are printed on the roll sheet B to be subsequently used. That is, the jobs having ID000005 and ID000007 are subjected to a printing process later even though the rearrangement operation based on priority is performed. Accordingly, the jobs are rearranged in the order illustrated in FIG. 18B, and the job list illustrated in FIG. 18C is obtained. Specifically, the jobs are reordered so that the jobs having ID000005 and ID000007 are printed on the roll sheet A and are also placed last in the queued job group for roll-sheet discharge. More specifically, among jobs that are included in the queued job group for roll-sheet discharge and that are to be printed on the roll sheet A, jobs for roll-sheet discharge corresponding to the amount of printing of the jobs having ID000005 and ID000007 are removed from the target for printing on the roll sheet A, and the jobs having ID000005 and ID000007 and the remaining jobs are rearranged so that the jobs having ID000005 and ID000007 can be printed on the roll sheet A.

Figure 7:
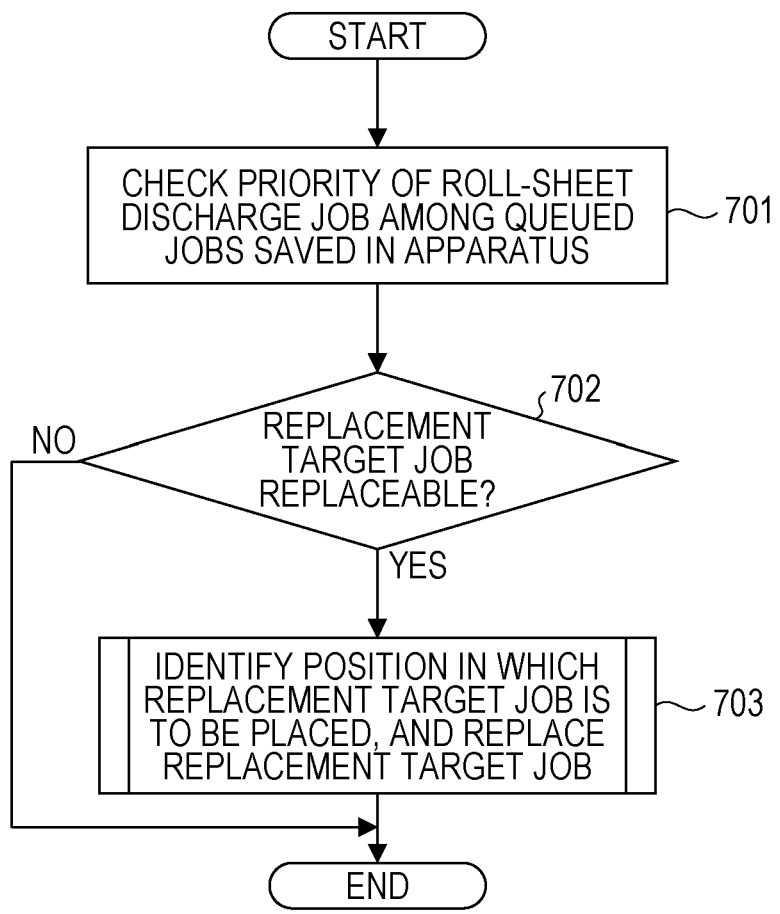
FIG. 7 is a flowchart illustrating the flow of a process for the roll-sheet discharge of a replacement target job according to the embodiment.

FIG. 7 illustrates the flow of the details of S606. That is, FIG. 7 illustrates an example of the flow of a rearrangement process for the roll-sheet discharge of a replacement target job. A queued job group for which roll-sheet discharge is set may be printed later than a replacement target job for which roll-sheet discharge is set, by printing the replacement target job early. Thus, there is no need to identify a replacement position in the illustrated process. Accordingly, the replacement target job is placed last of all the received but yet-to-be-printed jobs so as to be printed as early as possible.

First, the CPU 202 checks the priorities of queued jobs saved in a job queue or the like in the image forming apparatus (S701). Here, unlike S601 or S602 in FIG. 6, the CPU 202 checks the priorities when roll-sheet discharge is set as the sheet discharge method for the replacement target job.

Then, the CPU 202 determines whether or not the replacement target job is replaceable with another job (S702). Here, the replacement target job is not replaceable when, for example, the priority of the replacement target job is lower than the priority of the job group (obtained in S701). In other words, the priority of the replacement target job is lower than the priority of the job group, and thus the replacement target job does not need to be replaced. The replacement target job is also not replaceable when the priority of the replacement target job is equal to the priority of the jobs in the job group. If the replacement target job is not replaceable, the process ends. On the other hand, if it is determined that the replacement target job is replaceable, the process proceeds to S703.

In S703, the CPU 202 identifies a replacement position in which the replacement target job is to be placed, and replaces the replacement target job. Then, the process ends. The details of the identification of a replacement position will be described below.

Figure 8:
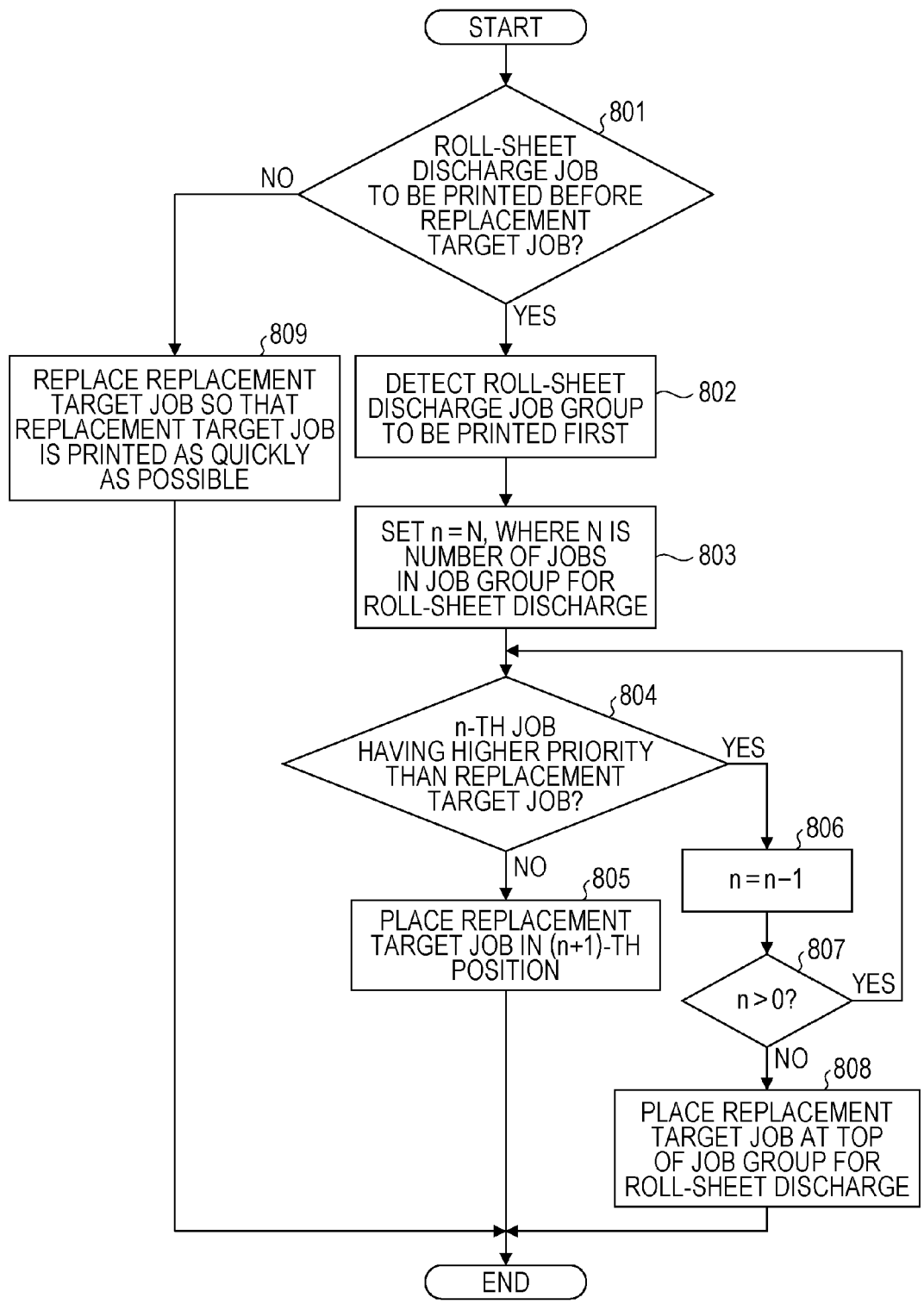
FIG. 8 is a flowchart illustrating the flow of a process for identifying a replacement position of a replacement target job for roll-sheet discharge according to the embodiment.

FIG. 8 illustrates the flow of the details of S703. That is, FIG. 8 illustrates the flow of a process for identifying a replacement position of the replacement target job for roll-sheet discharge.

First, the CPU 202 checks whether or not jobs that are to be printed before the replacement target job include a job for roll-sheet discharge (hereinafter also referred to as the "roll-sheet discharge job") (S801). If it is determined that there is no roll-sheet discharge job to be printed before the replacement target job, the process proceeds to S809. If it is determined that there is a roll-sheet discharge job to be printed before the replacement target job, the process proceeds to S802.

In S809, the CPU 202 replaces the replacement target job so that the replacement target job is printed as early as possible. In this embodiment, the replacement target job is replaced using the same method as the replacement method used in S607 in FIG. 6.

In S802, the CPU 202 detects a roll-sheet discharge job group that will be printed first. Then, the process proceeds to S803. The term "roll-sheet discharge job group", as used herein, refers to a roll-sheet discharge job group in which one or more roll-sheet discharge jobs are arranged in consecutive order. The term "roll-sheet discharge job group that is printed first" refers to a group of jobs for roll-sheet discharge that are arranged currently first among yet-to-be-printed jobs saved in a job queue or the like. In this embodiment, it is possible to switch between roll-sheet discharge and cut-sheet discharge. Thus, for example, ten jobs may be scheduled for roll-sheet discharge, then five jobs for cut-sheet discharge, and then seven jobs again for roll-sheet discharge. In this example, the first printed roll-sheet discharge job group corresponds to the first ten jobs, that is, the job group that is first subjected to roll-sheet discharge, and does not correspond to the seven jobs that are subsequently subjected to roll-sheet discharge. In S803, the CPU 202 sets n=N, where N represents the number of jobs included in the job group detected in S802 and n denotes a variable for computation. Then, the process proceeds to S804.

In S804, the CPU 202 determines whether or not the priority of the n-th job is higher than that of the replacement target job. If the priority of the n-th job is higher than that of the replacement target job, the process proceeds to S806. In this case, the n-th job is not interrupted with the replacement target job. On the other hand, if it is determined that the priority of the n-th job is not higher than that of the replacement target job, the process proceeds to step 805.

In S805, the CPU 202 places the replacement target job in the (n+1)-th position. Then, the rearrangement process ends.

In S806, the CPU 202 sets n=n−1. In S807, the CPU 202 determines whether or not n>0 is satisfied. If n>0 is satisfied, there remains a job to be compared with the replacement target job. Thus, the process returns to S804. On the other hand, if it is determined in S807 that n>0 is not satisfied, the process proceeds to S808, in which the CPU 202 places the replacement target job at the top of the job group for roll-sheet discharge. Then, the process ends. The reason that the replacement target job is placed at the top of the job group for roll-sheet discharge is that when a queued job group includes a replacement target job, the priority of the replacement target job is the lowest. Through the process illustrated in FIG. 8, when a replacement target job is a job for roll-sheet discharge, queued jobs can be rearranged so that a high-priority job is output as early as possible in the downstream operation. Specifically, the order of printing is determined so that a high-priority job for roll-sheet discharge is printed as late as possible in the downstream operation. In a case where a plurality of priority levels can be set, the order of printing can be determined so that a print job having a higher priority is printed later.

In this embodiment, a high-priority job for roll-sheet discharge is replaced within a roll-sheet discharge job group that is printed first (S802, S803), for illustrative but not limitative purposes. In S802, for example, roll-sheet discharge jobs adjacent to a replacement target job may be detected. Then, the order of printing may be determined so that the replacement target job is printed after the other print jobs in a job group for continuous-sheet discharge adjacent to an input print job for roll-sheet discharge among the queued print jobs.

Figure 9:
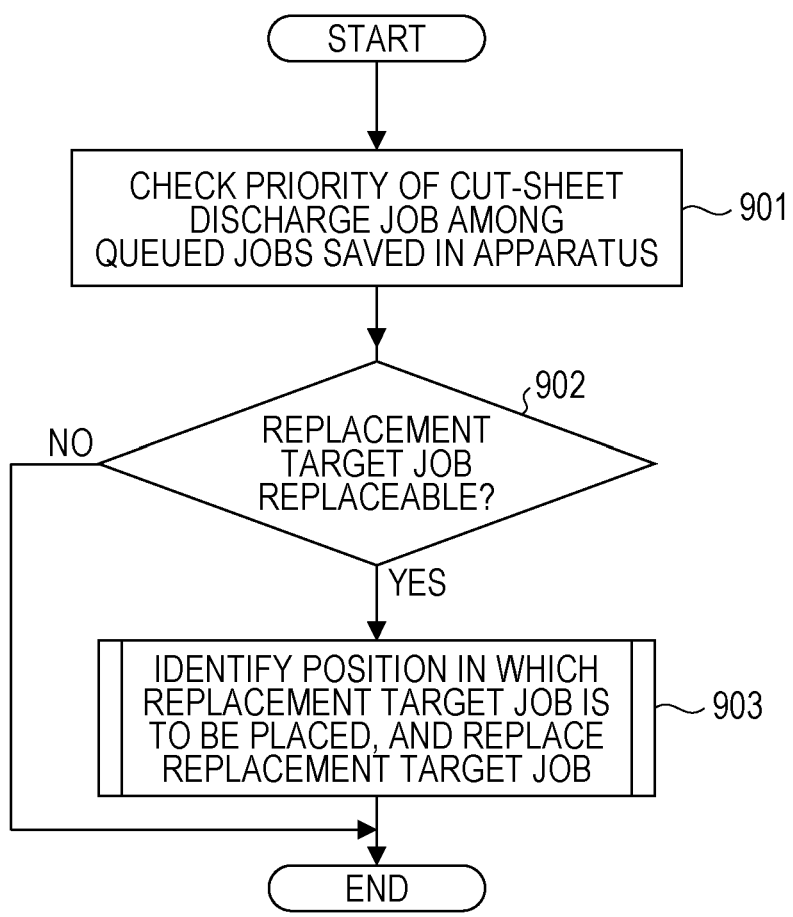
FIG. 9 is a flowchart illustrating the flow of a process for the cut-sheet discharge of a replacement target job according to the embodiment.

FIG. 9 illustrates the flow of the details of S605. That is, FIG. 9 illustrates an example of the flow of a rearrangement process of a replacement target job for cut-sheet discharge.

First, the CPU 202 checks the priorities of queued jobs saved in the image forming apparatus (S901). Here, unlike S601 or S602 in FIG. 6, the CPU 202 checks the priorities when cut-sheet discharge is set as the sheet discharge method for the replacement target job.

Then, the CPU 202 determines whether or not the replacement target job is replaceable, on the basis of the priorities checked in S901 (S902). Here, the replacement target job is not replaceable when, for example, the priority of the replacement target job is lower than the priority of the other jobs (the queued jobs obtained in S901). In other words, the priority of the replacement target job is lower than the priority of the other jobs, and thus the replacement target job does not need to be replaced. If the replacement target job is not replaceable, the process ends. On the other hand, if it is determined that the replacement target job is replaceable, the process proceeds to S903.

In S903, the CPU 202 identifies a replacement position in which the replacement target job is to be placed, and replaces the replacement target job. Then, the process ends. The details of the identification of a replacement position will be described below with reference to FIG. 10.

Figure 10:
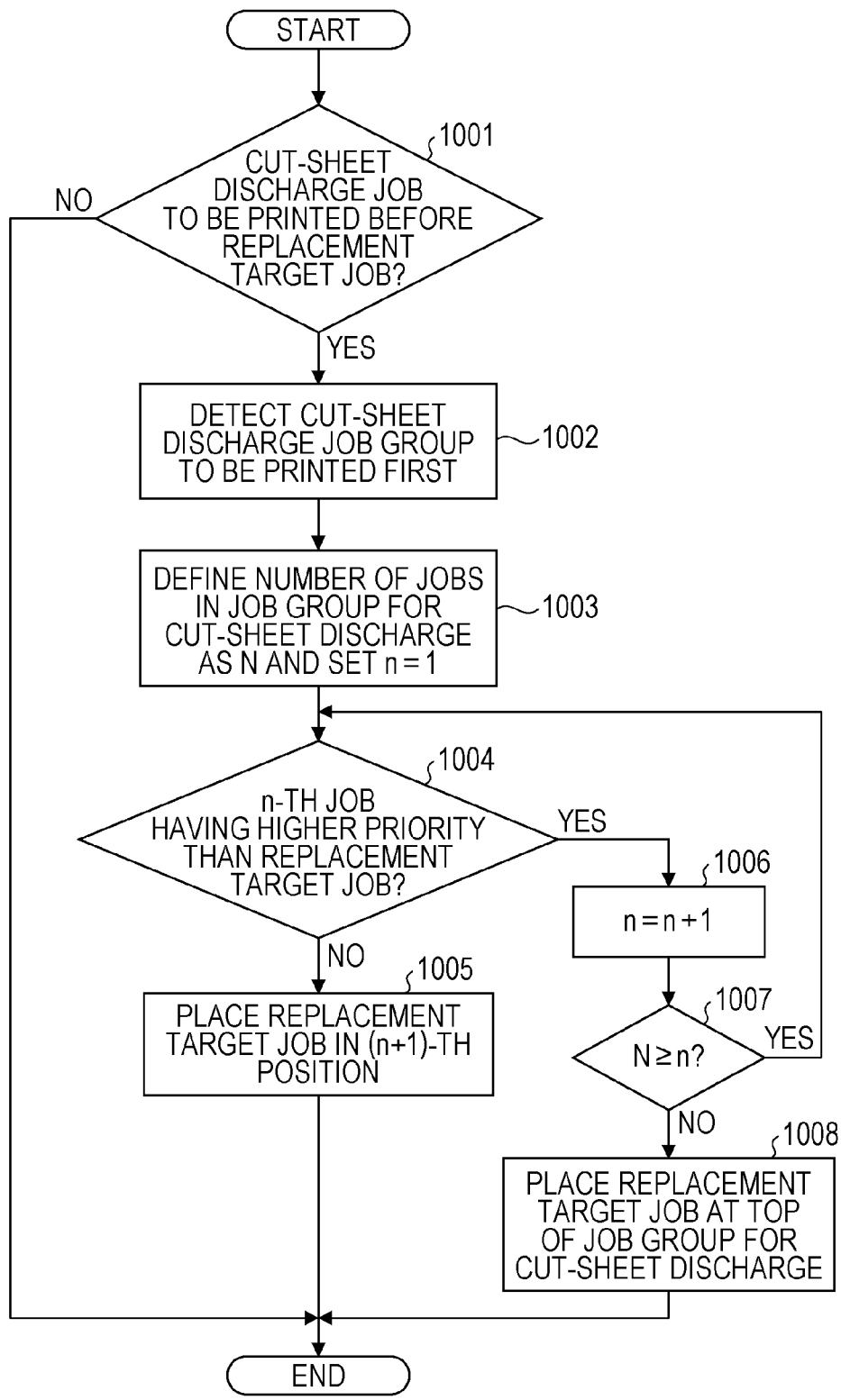
FIG. 10 is a flowchart illustrating the flow of a process for identifying a replacement position of a replacement target job for cut-sheet discharge according to the embodiment.

FIG. 10 illustrates the flow of the details of S903. That is, FIG. 10 is a flowchart illustrating the flow of a process for identifying a replacement position of the replacement target job for cut-sheet discharge.

First, the CPU 202 checks whether or not there is a cut-sheet discharge job to be printed before the replacement target job (S1001). If it is determined that there is no cut-sheet discharge job to be printed before the replacement target job, the CPU 202 does not perform rearrangement, and then the process ends. On the other hand, if it is determined that there is a roll-sheet discharge job to be printed before the replacement target job, the process proceeds to S1002.

In S1002, the CPU 202 detects a cut-sheet discharge job group that will be printed first. The term "cut-sheet discharge job group", as used herein, refers to a cut-sheet discharge job group in which one or more cut-sheet discharge jobs are arranged in consecutive order. The term "cut-sheet discharge job group that is printed first" refers to a group of jobs for cut-sheet discharge that are arranged currently first among yet-to-be-printed jobs saved in a job queue or the like. In this embodiment, it is possible to switch between roll-sheet discharge and cut-sheet discharge. Thus, for example, ten jobs may be scheduled for cut-sheet discharge, then five jobs for roll-sheet discharge, and then seven jobs for cut-sheet discharge. In this case, the first printed cut-sheet discharge job group is a job group subjected to discharge based on the first ten jobs, and is not a job group subjected to cut-sheet discharge based on the seven jobs.

Then, the CPU 202 defines as N the number of jobs included in the job group detected in S1002, and sets n=1, where n denotes a variable for computation (S1003).

Then, the CPU 202 determines whether or not the priority of the n-th job is higher than that of the replacement target job (S1004). If the priority of the n-th job is higher than that of the priority of the replacement target job, the process proceeds to S1006, because the n-th job is not interrupted with the replacement target job. On the other hand, if it is determined that the priority of the n-th job is not higher than that of the replacement target job, the process proceeds to S1005.

In S1005, the CPU 202 places the replacement target job in the (n+1)-th position. Then, the rearrangement process ends.

In S1006, the CPU 202 sets n=n+1, and then the process proceeds to S1007.

In S1007, the CPU 202 determines whether or not N≥n is satisfied. If N≥n is not satisfied, there remains a job to be compared with the replacement target job. Thus, the process returns to S1004. On the other hand, if it is determined that N≥n is satisfied, when a queued job group includes a replacement target job, the priority of the replacement target job is the lowest. For this reason, the process proceeds to S1008, in which the CPU 202 places the replacement target job at the top of the job group for roll-sheet discharge. Then, the process ends.

Through the process illustrated in FIG. 10, when a replacement target job is a job for cut-sheet discharge, queued jobs can be rearranged so that a sheet associated with a high-priority job is output as early as possible in the downstream operation. Specifically, the order of printing is determined so that a high-priority job is printed early. In a case where a plurality of priority levels can be set, the order of printing can be determined so that a print job having a higher priority is printed earlier.

In this embodiment, a high-priority job for cut-sheet discharge will be printed within a cut-sheet discharge job group that is printed first (S1002, S1003), for illustrative but not limitative purposes. In S1002, for example, cut-sheet discharge jobs adjacent to a replacement target job may be detected. Then, as illustrated in FIGS. 16A and 16B, the order of printing may be determined so that the replacement target print job is printed before the other print jobs in a job group for cut-sheet discharge adjacent to the replacement target print job among queued print jobs.

The processes illustrated in FIGS. 7 to 10 allow a replacement target job to be placed at an appropriate position.

Figure 11:
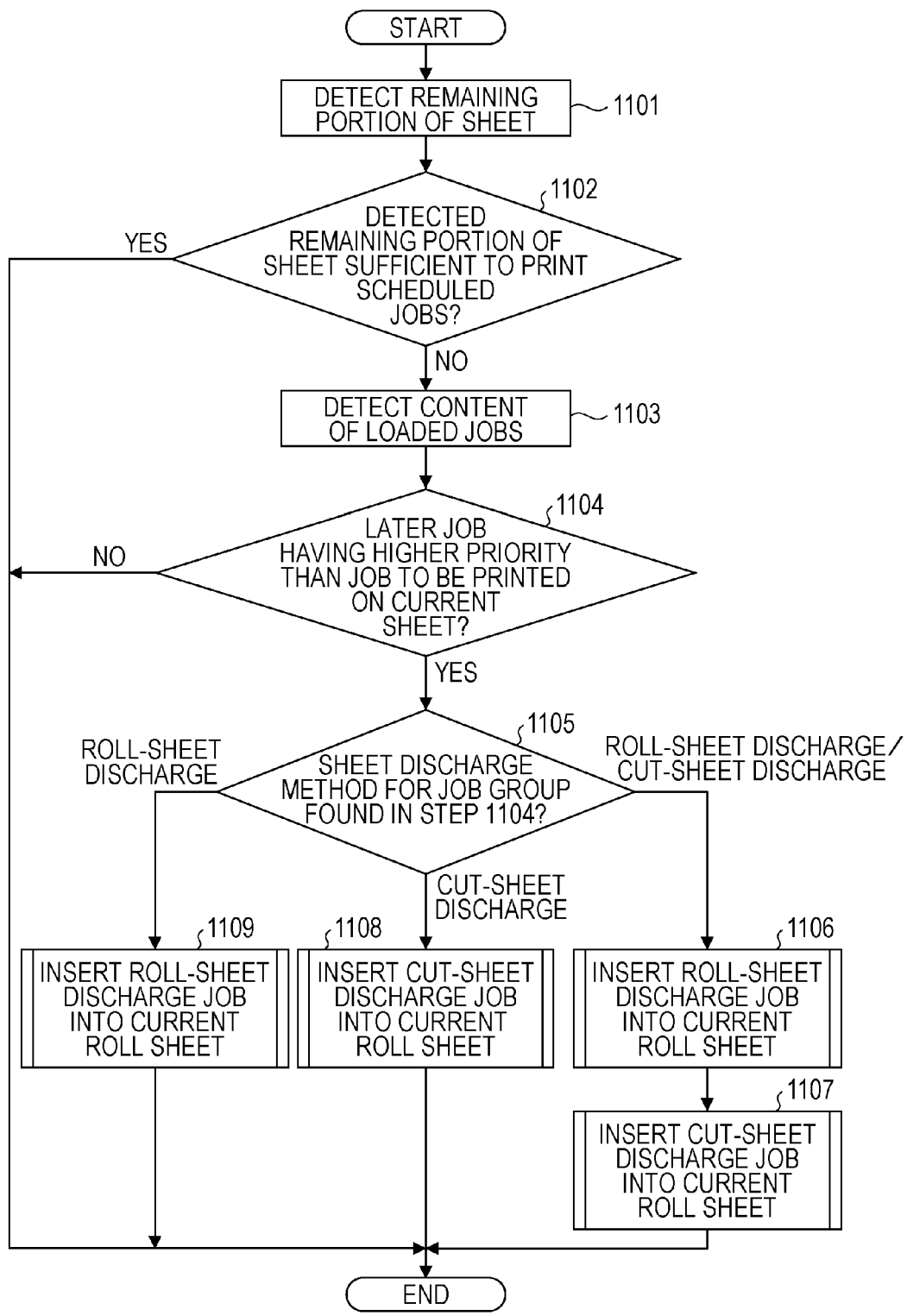
FIG. 11 is a flowchart of a rearrangement process based on the length of a remaining portion of a sheet according to the embodiment.

FIG. 11 is a flowchart of a rearrangement process based on the length of a remaining portion of a sheet. The flowchart illustrates the flow of a process performed when the CPU 202 of the main control unit 201 loads a control program stored in the ROM 203 or the HDD 206 into the RAM 204 and executes the control program.

In the process illustrated in FIG. 11, if jobs to be printed using more than one roll are present, or in other words, if it is not possible to print all the waiting print jobs on the current roll in use, the jobs are rearranged in accordance with the length of a detected remaining portion of a sheet. In this case, control is performed so that as many jobs as possible can be printed on the current roll in use.

First, the CPU 202 detects a remaining portion of the sheet (S1101). That is, the CPU 202 detects the remaining amount of roll paper currently in use.

Then, the CPU 202 determines whether or not the detected remaining portion of the sheet is sufficient to print the jobs to be printed, or the queued jobs (S1102). If it is possible to print all the queued jobs on the remaining portion of the sheet, it is determined that the detected remaining portion of the sheet is sufficient. If it is determined that all the jobs to be printed are printable on the remaining portion of the sheet, the process ends. On the other hand, if it is determined that the detected remaining portion of the sheet is not sufficient, the process proceeds to S1103.

In S1103, the CPU 202 identifies the content of the jobs loaded in the image forming apparatus 200 (in this embodiment, the content of the jobs in the job queue). Specifically, the CPU 202 acquires job information such as the sheet volume required to print each job and the priority of each job. Then, the process proceeds to S1104.

In S1104, the CPU 202 determines whether or not a job having a higher priority than jobs that will be printed on the detected remaining portion of the sheet is included in a job group that will not be printable on the remaining portion of the sheet. If a job having a higher priority than the jobs that will be printed on the remaining portion of the sheet is not included in the job group that will not be printable on the remaining portion of the sheet, the process ends, or otherwise, the process proceeds to S1105.

In S1105, the CPU 202 determines the sheet discharge method for the job group determined in S1104 to have a higher priority than the jobs that will be printed on the remaining portion of the sheet. Here, the sheet discharge method for a "job group" is determined since there may be a plurality of jobs determined to have a higher priority than the jobs that will be printed on the remaining portion of the sheet. Note that there may be a single job determined to have a higher priority than the jobs that will be printed on the remaining portion of the sheet. If the sheet discharge method for the target job or jobs is roll-sheet discharge, the process proceeds to S1109. If the sheet discharge method for the target job or jobs is cut-sheet discharge, the process proceeds to S1108. If two or more jobs are determined to have a higher priority than the jobs that will be printed on the remaining portion of the sheet and the sheet discharge method for the jobs includes cut-sheet discharge and roll-sheet discharge, the process proceeds to S1106.

In S1109, the CPU 202 inserts the roll-sheet discharge job or jobs into a continuous sheet that is used earlier (in an example, the current roll sheet in use), the details of which will be described below. Then, the process ends.

In S1108, the CPU 202 inserts the cut-sheet discharge job or jobs into a continuous sheet that is used earlier (in an example, the current roll sheet in use), the details of which will be described below. Then, the process ends.

In S1106, the CPU 202 performs interrupt and rearrangement for the roll-sheet discharge job or jobs. Then, in step 1107, the CPU 202 inserts the cut-sheet discharge job or jobs into the current roll sheet in use. Then, the process ends. S1106 and S1107 are similar to S1109 and S1108, respectively, and will not be described again. Note that the order of S1107 and S1108 may be reversed.

Figure 12:
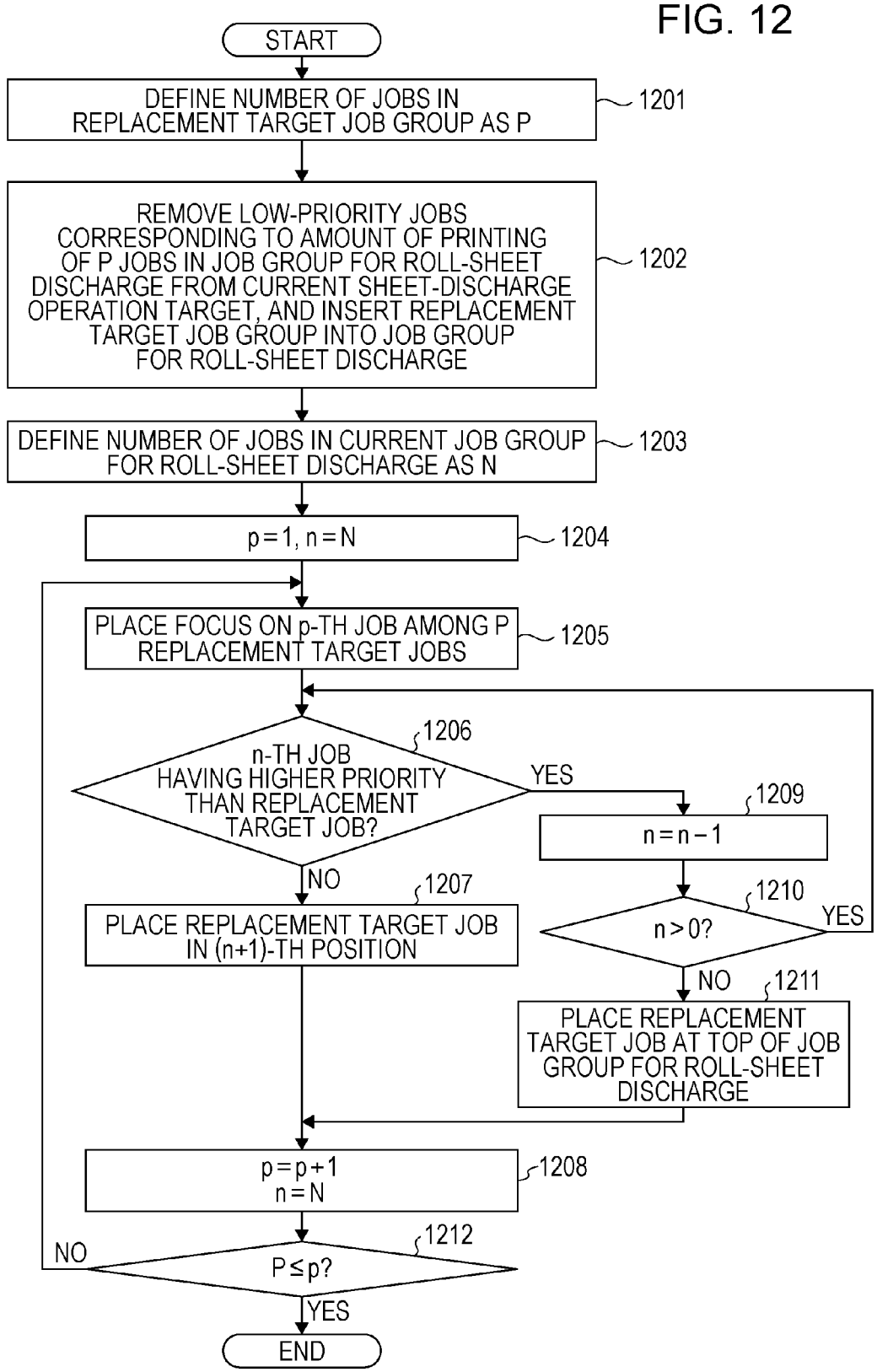
FIG. 12 is a flowchart of a process for rearranging jobs for roll-sheet discharge in accordance with the length of a remaining portion of a sheet according to the embodiment.

FIG. 12 illustrates the flow of the details of S1109. That is, FIG. 12 illustrates an example of the flow of process for rearranging jobs for roll-sheet discharge in accordance with the length of the remaining portion of the sheet. First, the CPU 202 defines as P the number of jobs in a job group having high priority (hereinafter referred to as the "replacement target job group") in S1104 among the jobs that will not be printable on the remaining portion of the sheet in S1103 (S1201).

Then, the CPU 202 removes a number of jobs in the job group for roll-sheet discharge which correspond to the amount of printing of the P jobs, from the targets for the current roll-sheet discharge operation, and instead, inserts the replacement target job group into the job group for roll-sheet discharge (S1202). That is, the CPU 202 rearranges the job group for roll-sheet discharge so that the replacement target job group is printed before the other low-priority jobs. Accordingly, the replacement target job group can be printed in the current roll-sheet discharge operation. That is, the replacement target job group can be printed on the current roll sheet in use and the sheet can be discharged as a roll sheet.

Then, the CPU 202 performs rearrangement again using the following process. First, the CPU 202 defines as N the number of jobs in the job group for roll-sheet discharge, which is reconfigured in S1202 (S1203). In other words, the CPU 202 defines as N the number of jobs in the job group for roll-sheet discharge adjacent to the print job for roll-sheet discharge replaced in the queued print jobs. Then, the CPU 202 sets p=1 and n=N (S1204), where p and n are variables. Then, focus is placed on the p-th job among the P replacement target jobs (S1205). The subsequent steps are performed on the job in question. The CPU 202 determines whether or not the n-th job has a higher priority than the replacement target job (S1206).

If it is determined in S1206 that the priority of the n-th job is not higher, the CPU 202 places the replacement target job in the (n+1)-th position (S1207), and sets p=p+1 and n=N to change the replacement target job (S1208). Then, the process proceeds to S1212.

If it is determined in S1206 that the priority of the n-th job is higher than that of the replacement target job, the CPU 202 sets n=n−1 (S1209), and checks whether there is a job to be compared for replacement. If it is determined in S1210 that n>0 is satisfied, the process returns to S1206. If it is determined that n>0 is not satisfied, there is no job to be replaced. Then, the process proceeds to S1211. The CPU 202 places the replacement target job at the top of the job group for job roll-sheet discharge (S1211), and sets p=p+1 and n=N to change the replacement target job (S1208). Then, the process proceeds to S1212.

In S1212, the CPU 202 determines whether or not P≤p is satisfied. If it is determined that P≤p is satisfied, the process ends. If it is determined that P≤p is not satisfied, the remains a replacement target job. Then, the process returns to S1205.

Accordingly, a roll-sheet discharge job to be printed on the remaining portion of the sheet is inserted into the top roll-sheet discharge job group.

Figure 13:
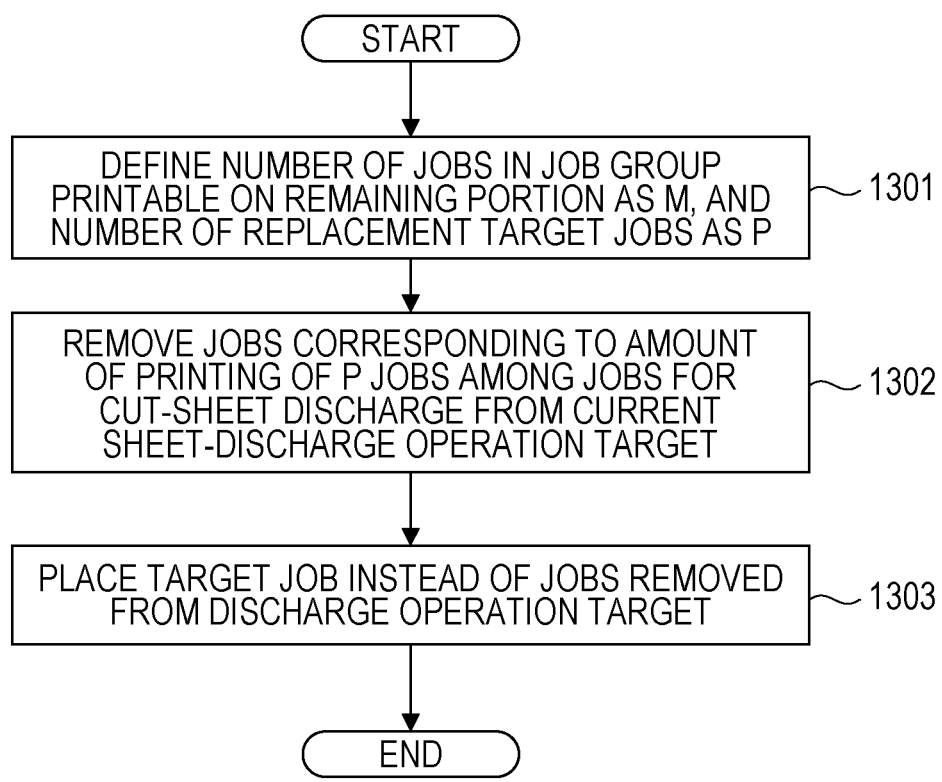
FIG. 13 is a flowchart of a process for rearranging jobs for cut-sheet discharge in accordance with the length of a remaining portion of a sheet according to the embodiment.

FIG. 13 illustrates the flow of the details of S1108. That is, FIG. 13 illustrates an example of the flow of a process for rearranging jobs for cut-sheet discharge in accordance with the length of a remaining portion of a sheet.

First, the CPU 202 defines as M the number of jobs in a job group printable on the remaining portion of the sheet, and defines as P the number of replacement target jobs (S1301). Then, the CPU 202 removes a number of jobs in the job group for cut-sheet discharge which correspond to the amount of printing of the P jobs, from the targets for the discharge operation using the current sheet in use (S1302). Then, the CPU 202 place the replacement target jobs instead of the jobs removed from the targets for discharge (S1303). Accordingly, the cut-sheet discharge jobs to be printed on the remaining portion of the sheet are rearranged. In the process illustrated in FIG. 13, cut-sheet discharge jobs to be printed on the remaining portion of the sheet are placed instead of jobs removed from the targets for discharge. Alternatively, the process illustrated in FIG. 10 may be executed instead of S1303.

The method described with reference to FIGS. 11 to 13 allows a high-priority job to be output as early as possible in accordance with the length of the remaining portion of the sheet. Specifically, the remaining portion of the sheet is detected, and jobs are rearranged so that a job having a higher priority than jobs to be output is printed on the current continuous sheet, allowing a high-priority job to be output as early as possible. In this case, if a high-priority job is a job for cut-sheet discharge, jobs are rearranged so that the job for cut-sheet discharge is printed at early on the current continuous sheet, whereas, if a high-priority job is a job for roll-sheet discharge, jobs are rearranged so that the job for roll-sheet discharge is printed later on the current continuous sheet.

Figure 14:
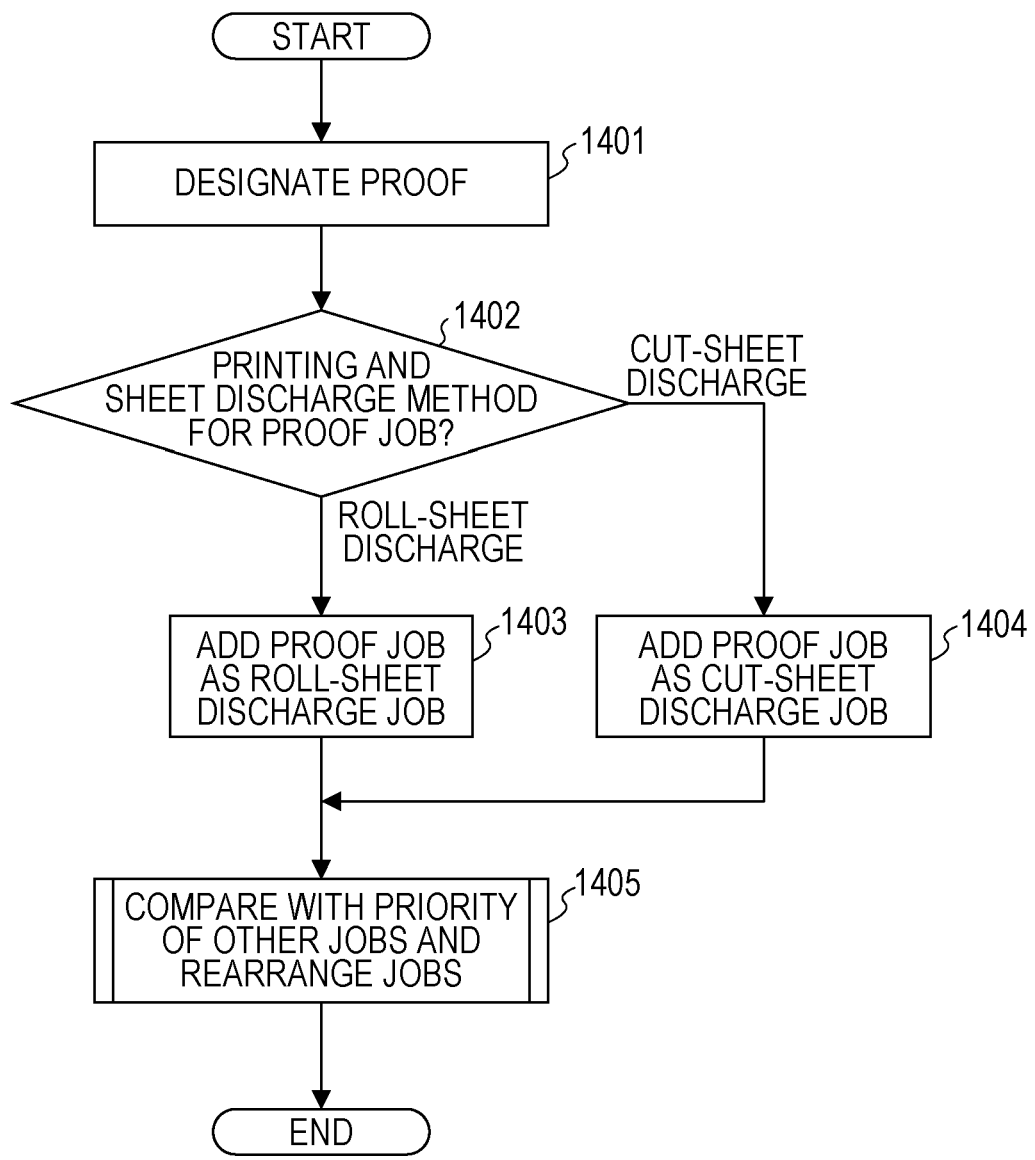
FIG. 14 is a flowchart of a rearrangement process when a proof job is entered according to the embodiment.

FIG. 14 is a flowchart of a rearrangement process when a proof job is entered. The flowchart illustrates the flow of a process performed when the CPU 202 of the main control unit 201 loads a control program stored in the ROM 203 or the HDD 206 into the RAM 204 and executes the control program.

In this embodiment, the printing and sheet discharge method for the proof job can be designated independent of the sheet discharge method for the original job. In addition, the proof job can be handled in a manner similar to that for the job described above (the final job).

First, the CPU 202 identifies a proof as having been designated (S1401). A proof may be designated by a user by specifying a job to be proofed through the operation unit 115.

Then, the CPU 202 determines the printing and sheet discharge method designated for the proof job (S1402). The determination is based on, for example, values saved in the setting of the main body. If the printing and sheet discharge method designated for the proof job is roll-sheet discharge, the process proceeds to S1403. If the printing and sheet discharge method designated for the proof job is cut-sheet discharge, the process proceeds to S1404.

In S1403, the CPU 202 sets the proof job as a job for roll-sheet discharge, and adds the proof job to the job list. Then, the process proceeds to S1405. Note that the proof job is handled in a manner similar to that for the other print jobs (the final job).

In S1404, the CPU 202 sets the proof job as a cut-sheet discharge, and adds the proof job to the job list. Then, the process proceeds to S1405. Note that the proof job is handled in a manner similar to that for the other print jobs (the final job).

In S1405, the CPU 202 compares the priority of the proof job with the priority of the other jobs, and replaces the proof job. The processing of S1405 is similar to that of S503 in FIG. 5, the details of which has been described with reference to the process illustrated in FIG. 6, and will not be described again.

As described above, when a proof job is entered, the proof job is also subjected to rearrangement in accordance with the sheet discharge method in a manner similar to a normal job, resulting in the proof job being output as early as possible. That is, the proof job may be output, as early as possible, preferentially to the other jobs.

FIGS. 20A to 20E illustrate an example of the display of a list of jobs entered into the image forming apparatus, depicting a rearrangement process performed in accordance with the length of the remaining portion of the sheet.

FIG. 20A illustrates a job list before the remaining portion of the sheet is detected. FIG. 20B illustrates a job list after the remaining portion of the sheet is detected. For example, a job list obtained when the "Current roll interrupt" button 1508 is selected on the setting screen illustrated in FIG. 15C is illustrated.

In the illustration of FIG. 20B, unlike FIG. 20A, the remaining portion of the sheet is not sufficient to print the jobs having ID000008 to ID000011, and the sheet for the jobs having ID000008 to ID000011 is changed from the roll sheet A to the roll sheet B.

Figure 20D:

In this case, the jobs having ID000009 and ID000010, which are high-priority jobs and are to be printed on the roll sheet A, are not printed on the roll sheet A, and are printed later even though they have a high priority. Accordingly, as illustrated in FIG. 20C, the jobs having ID000009 and ID000010 are modified so as to be printed on the roll sheet A. Then, as illustrated in FIG. 20D, jobs that are to be printed on the roll sheet A and have lower priority than the jobs having ID000009 and ID000010 (here, jobs having "normal priority") are modified so as to be printed on the roll sheet B. In this embodiment, jobs having an amount of printing greater than or equal to the amount of printing of the jobs having ID000009 and ID000010 need to be modified so as to be printed on the roll sheet B. In this embodiment, the amount of printing of the jobs having ID000005 to ID000007 is equivalent to an amount greater than or equal to the amount of printing of the jobs having ID000009 and ID000010. Thus, the jobs having ID000005 to ID000007 are modified so as to be printed on the roll sheet B. Thus, the order of printing illustrated in FIG. 20E is obtained, and the jobs having ID000009 and ID000010 are printed with the jobs having ID000003 and ID000004.

In the manner described above, when the roll sheet to be used is changed after the remaining portion of the sheet is detected, the order of printing may be determined so that a high-priority job is replaced so as to be discharged earlier. That is, in a case where queued print jobs are printed on a plurality of continuous sheets, the order of printing is determined so that a print job having a higher priority than the other print jobs is printed on a continuous sheet used first among the plurality of continuous sheets.

A job list screen indicating that the jobs having ID000009 and ID000010 will be printed on the subsequent roll sheet (that is, the roll sheet B) is displayed, allowing the user to change setting of the interrupt method.

As described above, according to this embodiment, it may be possible to place a high-priority job in a position so that the high-priority job can be obtained immediately after post-processing, in accordance with the output method of the image forming apparatus.

Other Embodiments

The exemplary embodiment described above is an example to achieve the advantages of the present disclosure, and additional exemplary embodiments that use similar but different methods or use different parameters to achieve advantages equivalent to those of the above-described exemplary embodiment are applicable.

In the above-described embodiment, jobs are rearranged in accordance with the priority of each job, for illustrative but not limitative purposes. For example, jobs may be rearranged in accordance with the priority of each predetermined unit such as each page. In this case, a priority may be set for each predetermined unit.

In the above-described embodiment, furthermore, two priority levels, that is, "normal priority" and "high priority", can be set, for illustrative but not limitative purposes. For example, three or more priority levels may be set.

In the above-described embodiment, roll-sheet discharge is used as an example of the method of discharging a sheet without cutting the sheet. However, any other method may be used to discharge a continuous sheet without cutting the continuous sheet. A process similar to that for roll-sheet discharge may be performed for continuous-sheet discharge in which it is possible to discharge a printed sheet in continuous-sheet form without winding the printed sheet.

In addition, the discharge method for a job is selectable from two methods, that is, cut-sheet discharge and roll-sheet discharge, for illustrative but not limitative purposes. The discharge method for a job may also be selectable from additional sheet discharge methods. In this case, the arrangement order of jobs may be changed in accordance with the sheet discharge method. Alternatively, the discharge method for a job may include only roll-sheet discharge. In a case where the discharge method for a job includes only roll-sheet discharge, a high-priority job may be printed after jobs waiting to print (for example, will be printed last). That is, it is sufficient to print a high-priority job later. After that, when a job having a priority lower than the high-priority job is received, the received job may be printed before the high-priority job, or jobs may be reordered so that the high-priority job will be printed last. Alternatively, the range within which the order of printing of high-priority jobs is changed may be set. For example, a predetermined number of jobs or each predetermined group may be set.

In the above-described embodiment, in the case of roll-sheet discharge, a sheet is wound starting from the first page, and a high-priority job is printed later in the case of roll-sheet discharge, for illustrative but not limitative purposes. In a case where a sheet is wound starting from the last page in the case of roll-sheet discharge or in a case where there is an option to select the first page or the last page from which a sheet is wound, the order of printing may be changed in accordance with the winding method. In other words, the order of printing may be changed in accordance with whether the discharge method is first-page discharge in which the sheet can be discharged from the first page or last-page discharge in which the sheet can be discharged from the last page.

In the above-described embodiment, the setting for changing the order of print jobs to be printed is performed on a setting screen. Alternatively, the order of print jobs to be printed may be changed automatically in accordance with the discharge method without instructions from the user.

The above-described embodiment may also be implemented by execution of the following process: software (program) that implements the functions of the above-described embodiment is supplied to a system or an apparatus via a network or various storage media, and a computer (such as a CPU or a microprocessing unit (MPU)) in the system or apparatus reads and executes the program. The program may be executed by a single computer or a plurality of computers that operate in association with each other. In addition, all the processes described above may not necessarily be implemented by software and some or all of the processes may be implemented by hardware such as an application specific integrated circuit (ASIC). In addition, a single CPU may not necessarily perform all the processes described above, and a plurality of CPUs may cooperate with one another, as appropriate, to perform processing.

As described above, a print product may be obtained immediately after a high-priority job has been printed, in accordance with the discharge method for the print job.

Other Embodiments

Additional embodiments of the present disclosure can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-248456, filed Nov. 29, 2013, which is hereby incorporated by reference herein in its entirety.

What is claimed is:

1. A print control apparatus, comprising:
   a first specifying unit configured to specify a priority of an input print job;
   a second specifying unit configured to specify a discharge method set for the input print job among a plurality of discharge methods including a roll-sheet discharge method in which a print product is discharged as a roll sheet and a cut-sheet discharge method in which a print product is discharged as a cut sheet;
   a determination unit configured to determine an order of printing of the input print job in queued print jobs held in a queue, in accordance with the priority of the input print job specified by the first specifying unit and the discharge method specified by the second specifying unit; and
   a print control unit configured to cause a print unit to execute printing based on the input print job on a continuous sheet in accordance with the order of printing of the print job determined by the determination unit, whereby a print product based on the input print job is discharged,
   wherein at least one of the first specifying unit, the second specifying unit, the determination unit, and the print control unit are implemented by at least one processor in the print control apparatus.

2. The print control apparatus according to claim 1, wherein the determination unit is configured to determine the order of printing of input print jobs so that the input print job will be printed after other print jobs in the queued print jobs in a case where the first specifying unit specifies that the input print job has a higher priority than the other print jobs and in a case where the second specifying unit specifies that the discharge method set for the input print job is the roll-sheet discharge.

3. The print control apparatus according to claim 1, wherein the determination unit is configured to determine the order of printing of the input print job so that the input print job will be printed after other print jobs in a job group for the roll-sheet discharge adjacent to the input print job from among the queued print jobs in a case where the first specifying unit specifies that the input print job has a higher priority than other print jobs in the queued print jobs and in a case where the second specifying unit specifies that the discharge method set for the input print job is the roll-sheet discharge.

4. The print control apparatus according to claim 1, wherein the determination unit is configured to determine the order of printing of the input print job so that the input print job will be printed before other print jobs in the queued print jobs in a case where the first specifying unit specifies that the input print job has a higher priority than the other print jobs and in a case where the second specifying unit specifies that the discharge method set for the input print job is the cut-sheet discharge.

5. The print control apparatus according to claim 4, wherein the determination unit is configured to determine the order of printing of the input print job so that the input print job will be printed before other print jobs in a job group for the cut-sheet discharge adjacent to the input print job from among the queued print jobs in a case where the first specifying unit specifies that the input print job has a higher priority than other print jobs in the queued print jobs and in a case where the second specifying unit specifies that the discharge method set for the input print job is the cut-sheet discharge.

6. The print control apparatus according to claim 1, wherein the determination unit is configured to determine the order of printing of the input print job by changing an order of printing of the queued print jobs.

7. The print control apparatus according to claim 1, wherein the determination unit is configured to determine the order of printing of the input print job by changing an order of printing of the queued print jobs in an order different from an order of input of the print jobs.

8. The print control apparatus according to claim 1, wherein the determination unit is configured to determine the order of printing of the input print job in accordance with a remaining amount of the continuous sheet.

9. The print control apparatus according to claim 1, wherein the determination unit is configured to determine an order of printing of the queued print jobs so that in a case where the queued print jobs will be printed on a plurality of continuous sheets, a print job having a higher priority than other print jobs in the queued print jobs is printed on a continuous sheet that is used earlier from among the plurality of continuous sheets.

10. The print control apparatus according to claim 1, further comprising the print unit.

11. A print control apparatus for controlling a printing device configured to discharge a printed sheet by a roll-sheet discharged method in which the printed sheet is discharged as a roll sheet, the printing apparatus comprising:
   a specifying unit configured to specify a priority of an input print job;
   a determination unit configured to determine an order of printing so that the input print job will be printed after other queued print jobs held in a queue in a case where the specifying unit specifies that the input print job has a higher priority than the other queued print jobs; and
   a print control unit configured to cause the printing device to execute printing based on the input print job on a continuous sheet in accordance with the order of printing determined by the determination unit,
   wherein at least one of the specifying unit, the determination unit, and the print control unit are implemented by at least one processor in the print control apparatus.

12. The print control apparatus according to claim 11, wherein the determination unit is configured to determine the order of printing of the input print job by changing an order of printing of the queued print jobs.

13. The print control apparatus according to claim 11, wherein the determination unit is configured to determine the order of printing of the input print job by changing an order of printing of the queued print jobs in an order different from an order of input of the print jobs.

14. The print control apparatus according to claim 11, wherein the determination unit is configured to determine the order of printing of the input print job in accordance with a remaining amount of the continuous sheet.

15. The print control apparatus according to claim 11, wherein the determination unit is configured to determine an order of printing of the queued print jobs so that in a case where the queued print jobs will be printed on a plurality of continuous sheets, a print job having a higher priority than other print jobs in the queued print jobs is printed on a continuous sheet that is used earlier from among the plurality of continuous sheets.

16. The print control apparatus according to claim 11, further comprising the printing device.

17. A print control method comprising:
   specifying a priority of an input print job;
   specifying a discharge method set for the input print job among a plurality of discharge methods including a roll-sheet discharge method in which a print product is discharged as a roll sheet and a cut-sheet discharge method in which a print product is discharged as a cut sheet;

determining an order of printing of the input print job in queued print jobs held in a queue in accordance with the specified priority of the input print job and the specified discharge method; and causing a print unit to execute printing based on the input print job on a continuous sheet in accordance with the determined order of printing of the print jobs held in the queue, whereby a print product based on the input print job is discharged, at least one of the specifying the priority, the specifying the discharge method, the determining, and the causing are performed by at least one processor.

18. A non-transitory computer-readable storage medium storing computer-executable instructions for causing a computer to execute a print control method, said method comprising:

specifying a priority of an input print job;

specifying a discharge method set for the input print job among a plurality of discharge methods including a roll-sheet discharge method in which a print product is discharged as a roll sheet and a cut-sheet discharge method in which a print product is discharged as a cut sheet;

determining an order of printing of the input print job in queued print jobs held in a queue in accordance with the specified priority of the input print job and the specified discharge method; and causing the print unit to execute printing based on the input print job on a continuous sheet in accordance with the determined order of printing of the print jobs held in the queue, whereby a print product based on the input print job is discharged, at least one of the specifying the priority, the specifying the specifying the discharge method, the determining, and the causing are performed by at least one processor in the computer.

19. A print control method for controlling a printing device configured to discharge a printed sheet by a roll-sheet discharge method in which the printed sheet is discharged as a roll sheet, the print control method comprising:

specifying a priority of an input print job;

determining an order of printing so that the input print job will be printed after other print jobs held in a queue in a case where it is determined that the input print job has a higher priority than the other print jobs; and executing printing based on the input print job on a continuous sheet in accordance with the determined order of printing, at least one of the specifying the priority, the determining, and the executing are performed by at least one processor.

* * * * *